United States Patent [19]

Miyamoto et al.

[11] Patent Number: 5,517,652
[45] Date of Patent: May 14, 1996

[54] MULTI-MEDIA SERVER FOR TREATING MULTI-MEDIA INFORMATION AND COMMUNICATION SYSTEM EMPOLYING THE MULTI-MEDIA SERVER

[75] Inventors: Takanori Miyamoto, Fuchu, Japan; Douglas Cardwell, Hempstead, N.Y.; Toshiro Suzuki, Tama; Mutsumi Abe, Kokubunji, both of Japan

[73] Assignee: Hitachi, Ltd., Tokyo, Japan

[21] Appl. No.: 707,914

[22] Filed: May 30, 1991

[30] Foreign Application Priority Data

May 30, 1990 [JP] Japan ................................... 2-138207
Mar. 26, 1991 [JP] Japan ................................... 3-061474

[51] Int. Cl.⁶ ................................................... G06F 15/16
[52] U.S. Cl. ................. 395/800; 364/940.92; 364/951.4; 364/940.61; 364/DIG. 2
[58] Field of Search .................................. 395/325, 800, 395/200, 500

[56] References Cited

U.S. PATENT DOCUMENTS

| | | | |
|---|---|---|---|
| 4,686,698 | 8/1987 | Tompkins | 379/53 |
| 4,704,725 | 11/1987 | Harvey | 380/9 |
| 4,920,432 | 4/1990 | Eggers | 360/33.1 |
| 4,937,784 | 6/1990 | Masai | 395/325 |
| 5,027,400 | 6/1991 | Baji | 380/20 |
| 5,195,092 | 3/1993 | Wilson | 370/94.2 |

FOREIGN PATENT DOCUMENTS 159886A 7/1986 Japan .

Primary Examiner—Eric Coleman
Attorney, Agent, or Firm—Antonelli, Terry, Stout & Kraus

[57] ABSTRACT

A multi-media server for treating multi-media information including video and voice information and a communication system including the multi-media server are provided. The multi-media server is suitable for the application and the system architecture for the multi-media information, a mail system utilizing animation and an application for editing a document. The multi-media server includes an interface circuit connected to a communication network and for controlling send/receive operations of a transmission frame, table memories for recording attribute information of each user terminal, a decoding circuit for decoding multi-media information included in the transmission frame received from the interface circuit by referring to the attribute information of the table memory, an information processing circuit for processing the decoded multi-media information according to the content of a header of the transmission frame, a coding circuit for coding the processed multi-media information according to the content of the header of the transmission frame, a memory unit for recording the coded multi-media information, and a controller for controlling the decoding circuit and the coding circuit to perform the processing for the kind of the multi-media information according to the content of the header of the transmission frame.

21 Claims, 23 Drawing Sheets

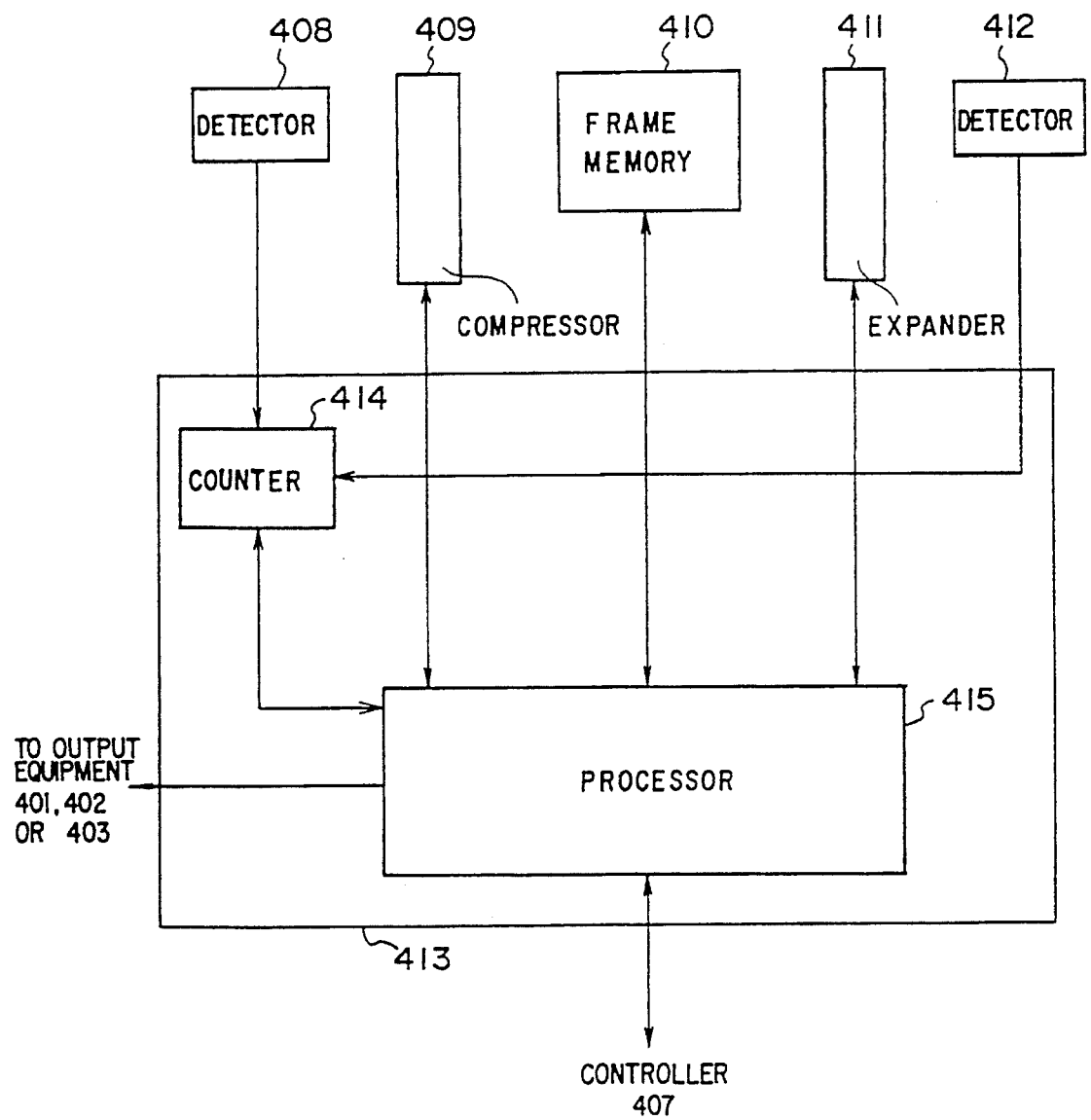

FIG. 7A MODE SETTING BASED ON TABLE
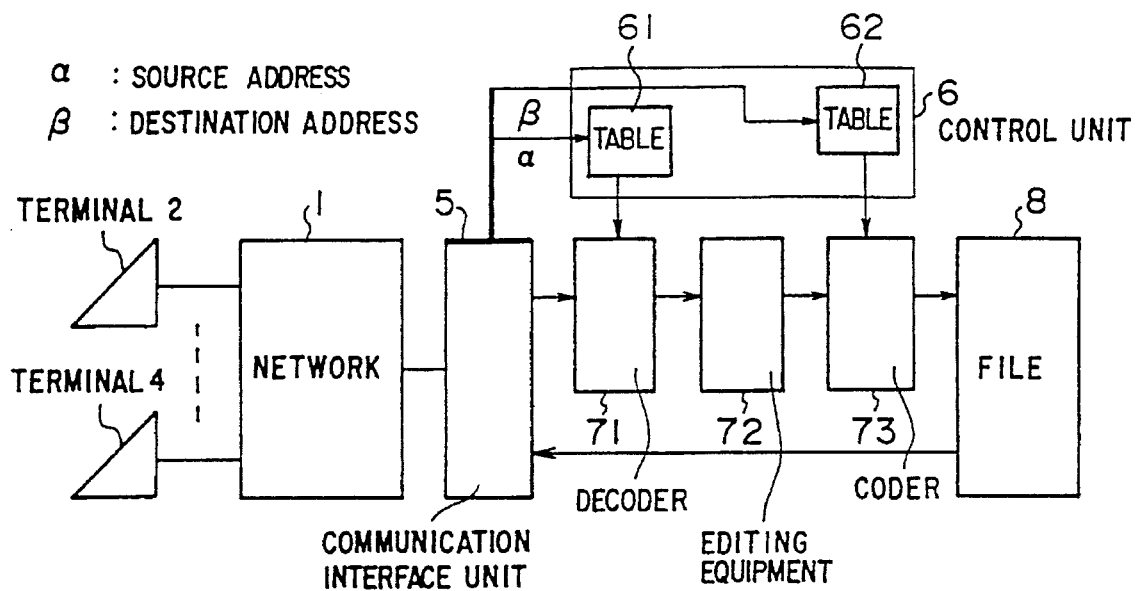
FIG. 7B CONNECTION BETWEEN SAME ATTRIBUTE TERMINALS
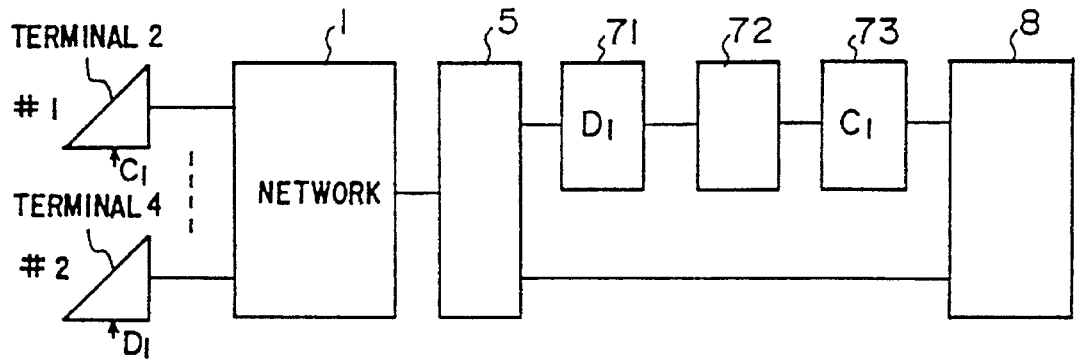
FIG. 7C CONNECTION BETWEEN RESPECTIVE ATTRIBUTE TERMINALS
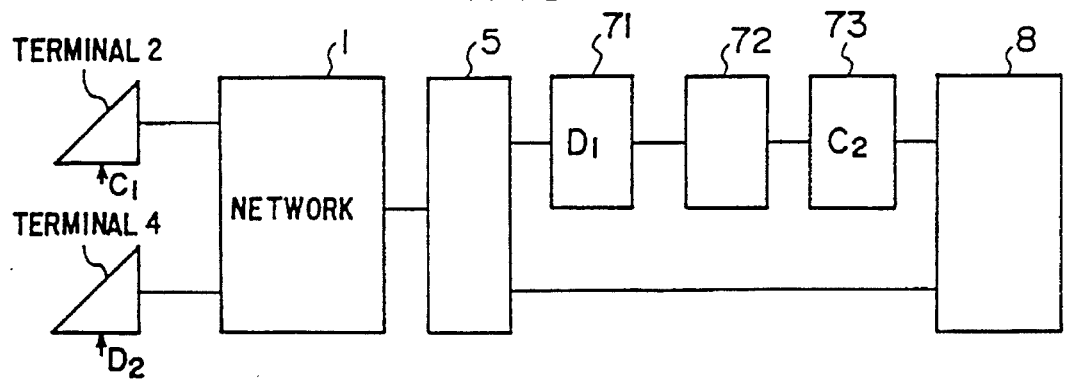

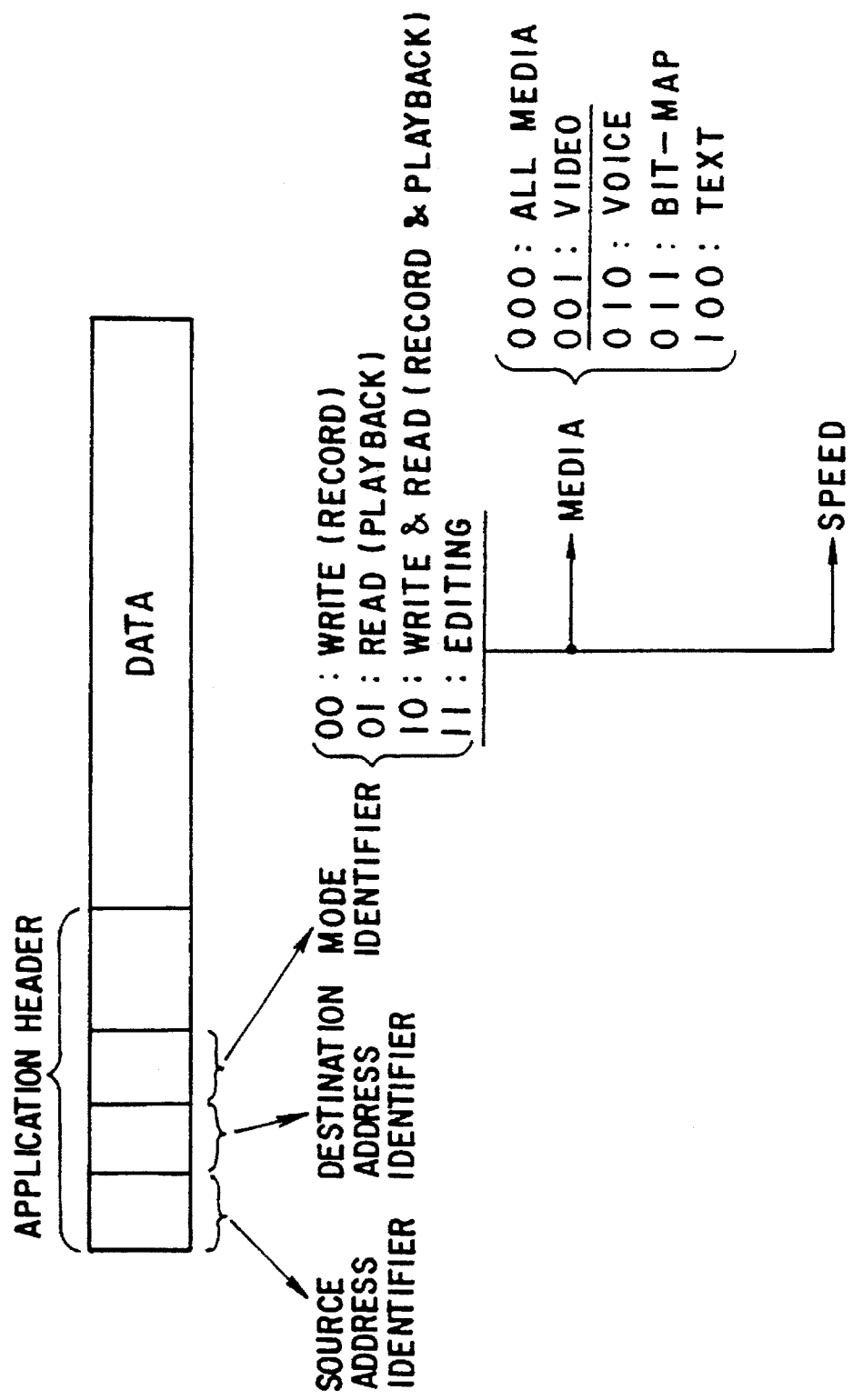

FIG. 9
| | VIDEO | | VOICE | | STILL IMAGE |
|---|---|---|---|---|---|
| 1 | PACKET/STM* | 1 | PACKET/STM* | 1 | BIT MAP |
| 2 | PCM | 2 | PCM | 2 | DCT |
| 3 | DCT + MOTION COMPENSATION | 3 | SB+ADPCM | 3 | MMR/MH |
| 4 | VECTOR QUANTIZATION | 4 | CELP | 4 | VECTOR FONT |
*(SYNCHRONOUS TRANSFER MODE)
FIG. 12A N-FOLD TRANSFER MODE (N:4)
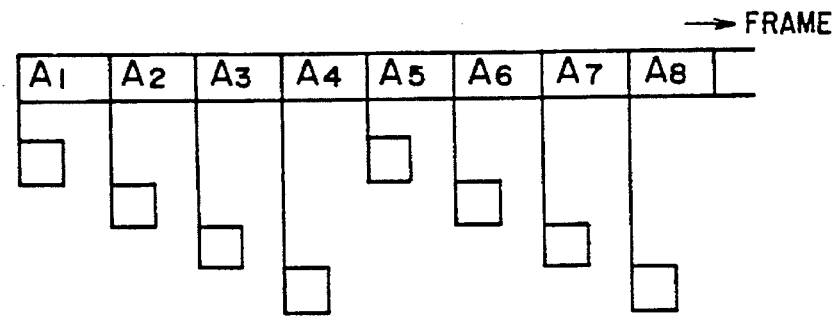
FIG. 12B N-FOLD TRANSFER MODE FOR MULTIUSER(M) (M=2, N=4)
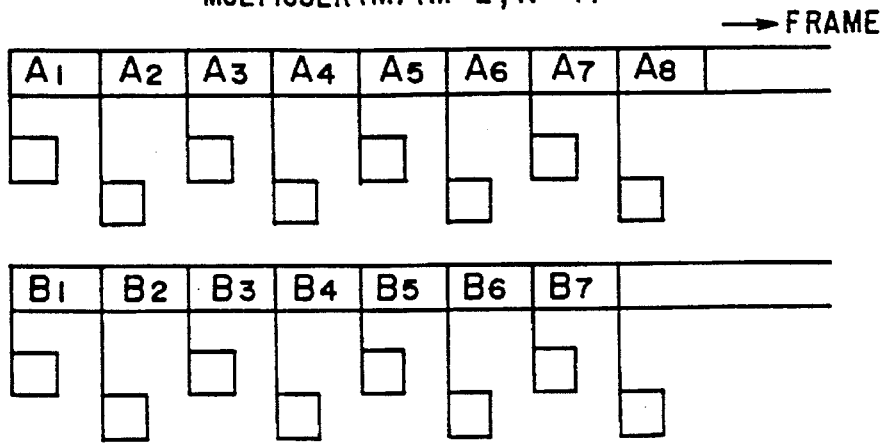

FIG. 11A   SERVER
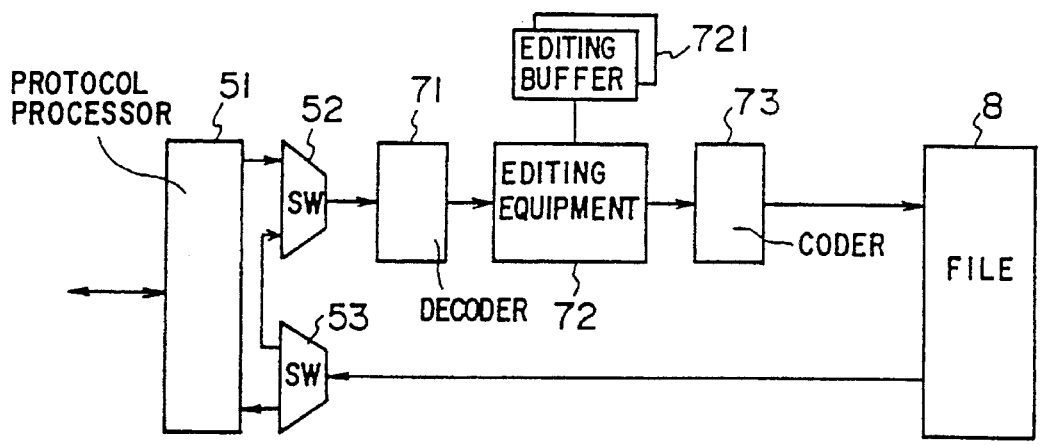
FIG. 11B   READING OF DATA INTO EDITING BUFFER
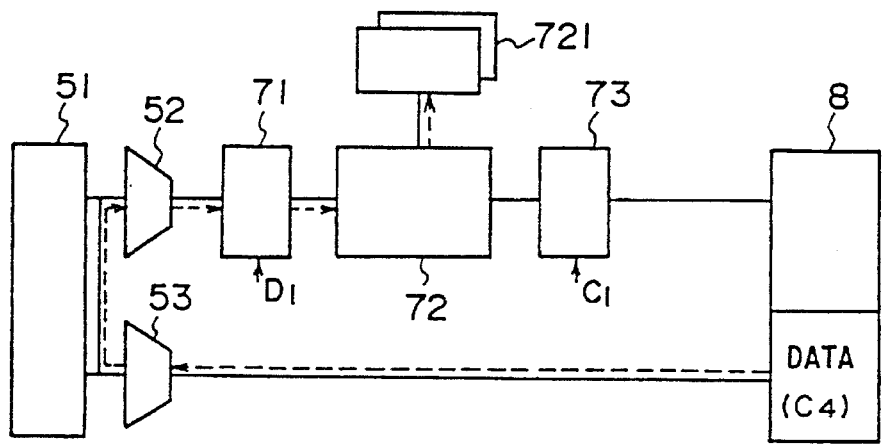
FIG. 11C   CONCURRENT EXECUTION OF "EDITION", "READ" AND "WRITE"
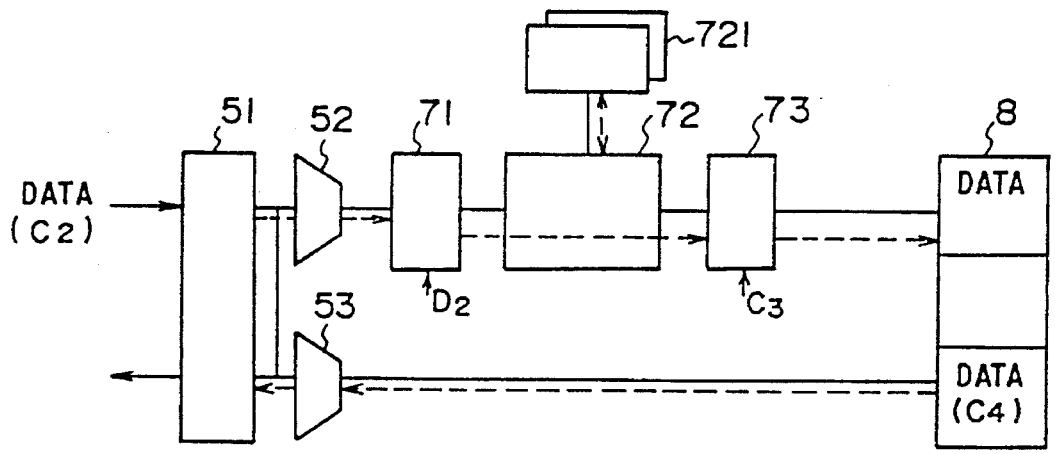

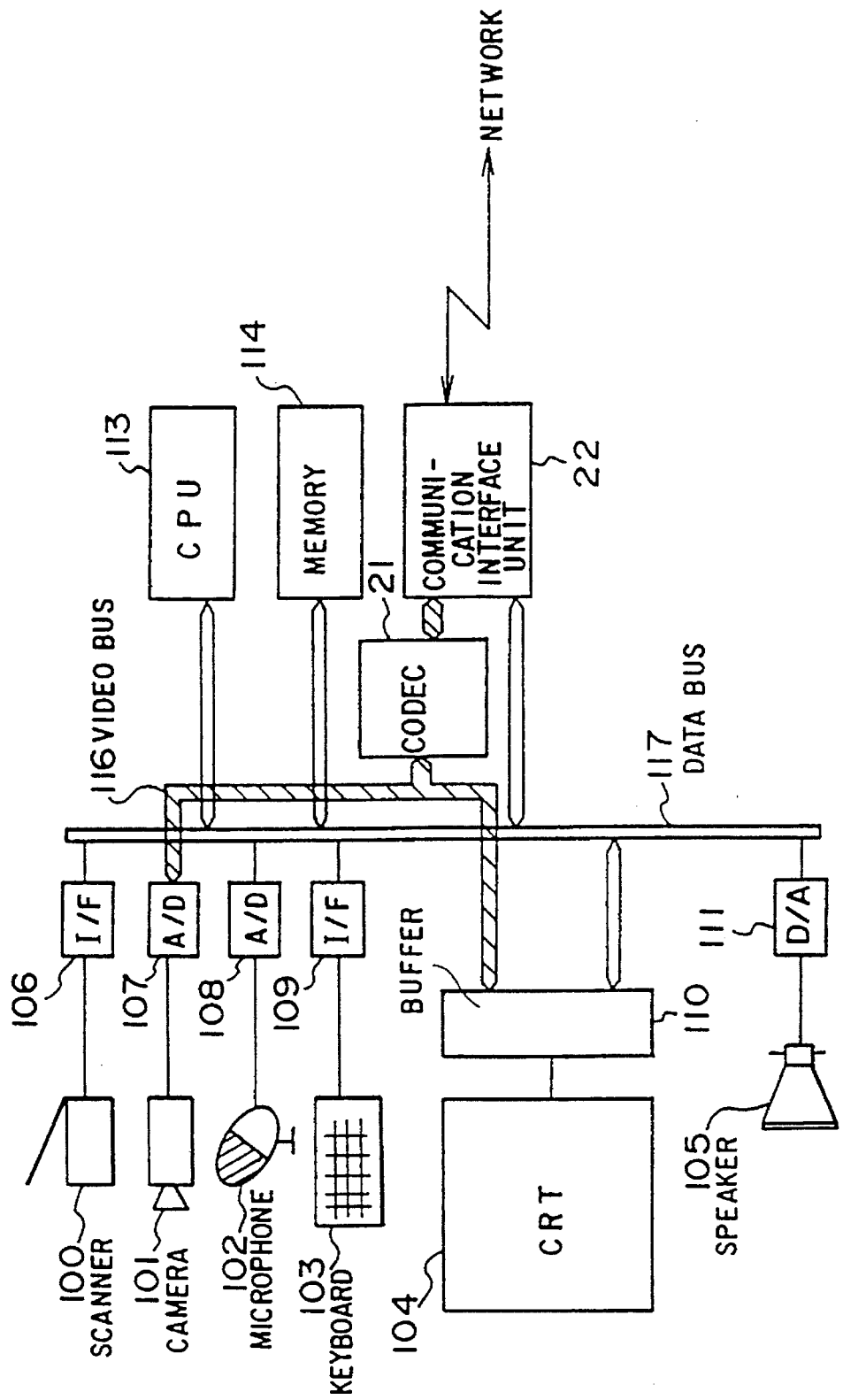

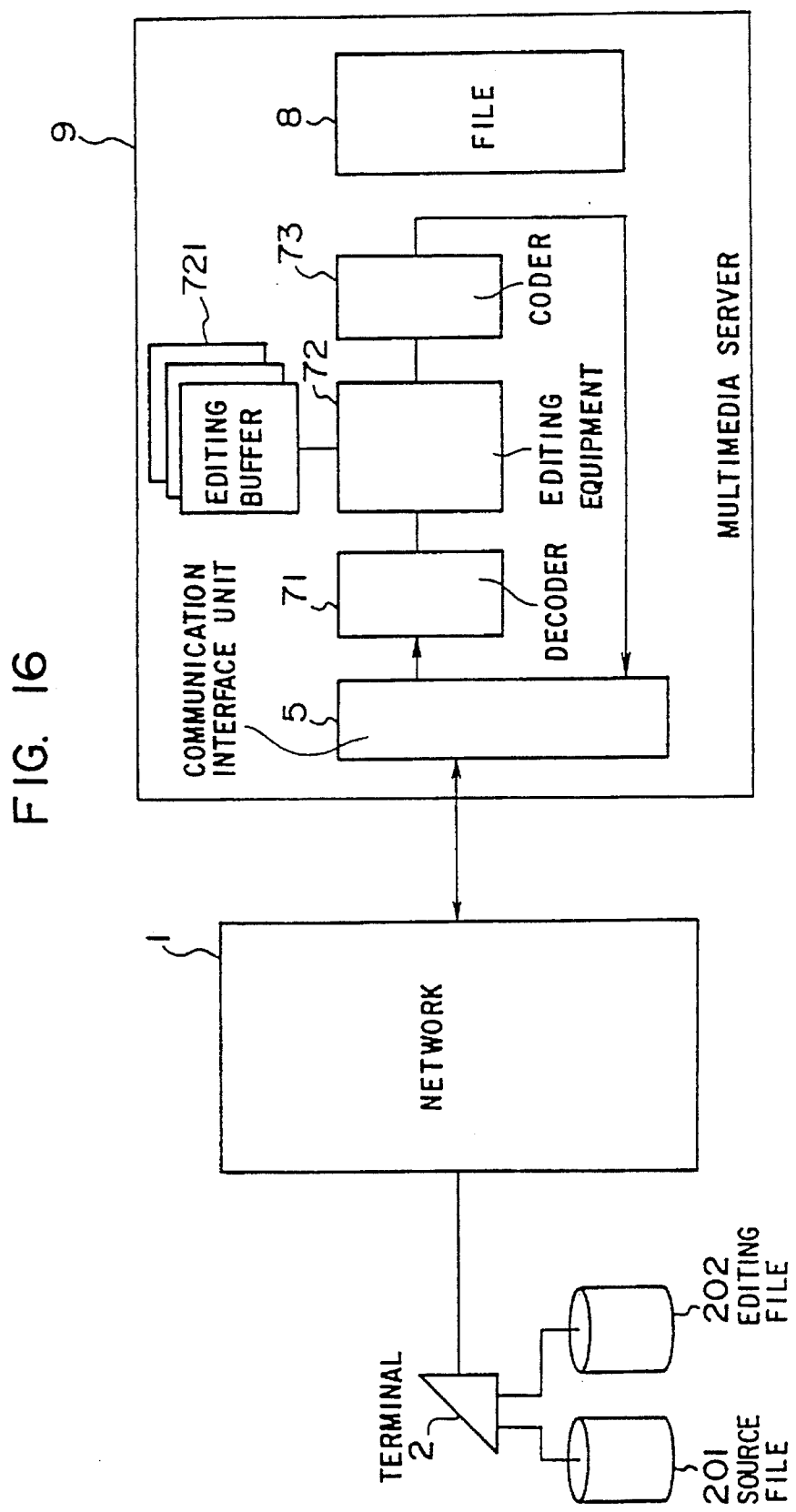

FIG. 19

DOCUMENT #1

| LABEL | NESTING | |
|---|---|---|
| | PARENT | CHILD |
| 1-1 | — | — |
| 1-2 | — | 3 |
| 1-3 | — | — |
| 1-4 | — | 2 |

DOCUMENT #2

| LABEL | NESTING | |
|---|---|---|
| | PARENT | CHILD |
| 2-1 | 1-4 | — |
| 2-2 | 1-4 | — |
| — | — | — |
| — | — | — |

DOCUMENT #3

| LABEL | NESTING | |
|---|---|---|
| | PARENT | CHILD |
| 3-1 | 1-2 | — |
| 3-2 | 1-2 | 4 |
| — | — | — |
| — | — | — |

DOCUMENT #4

| LABEL | NESTING | |
|---|---|---|
| | PARENT | CHILD |
| 4-1 | 3-2 | — |
| 4-2 | 3-2 | — |
| 4-3 | 3-2 | — |
| — | — | — |

INTER-FIELD TABLE

DIRECTORY WINDOW

MAN-MACHINE INTERFACE

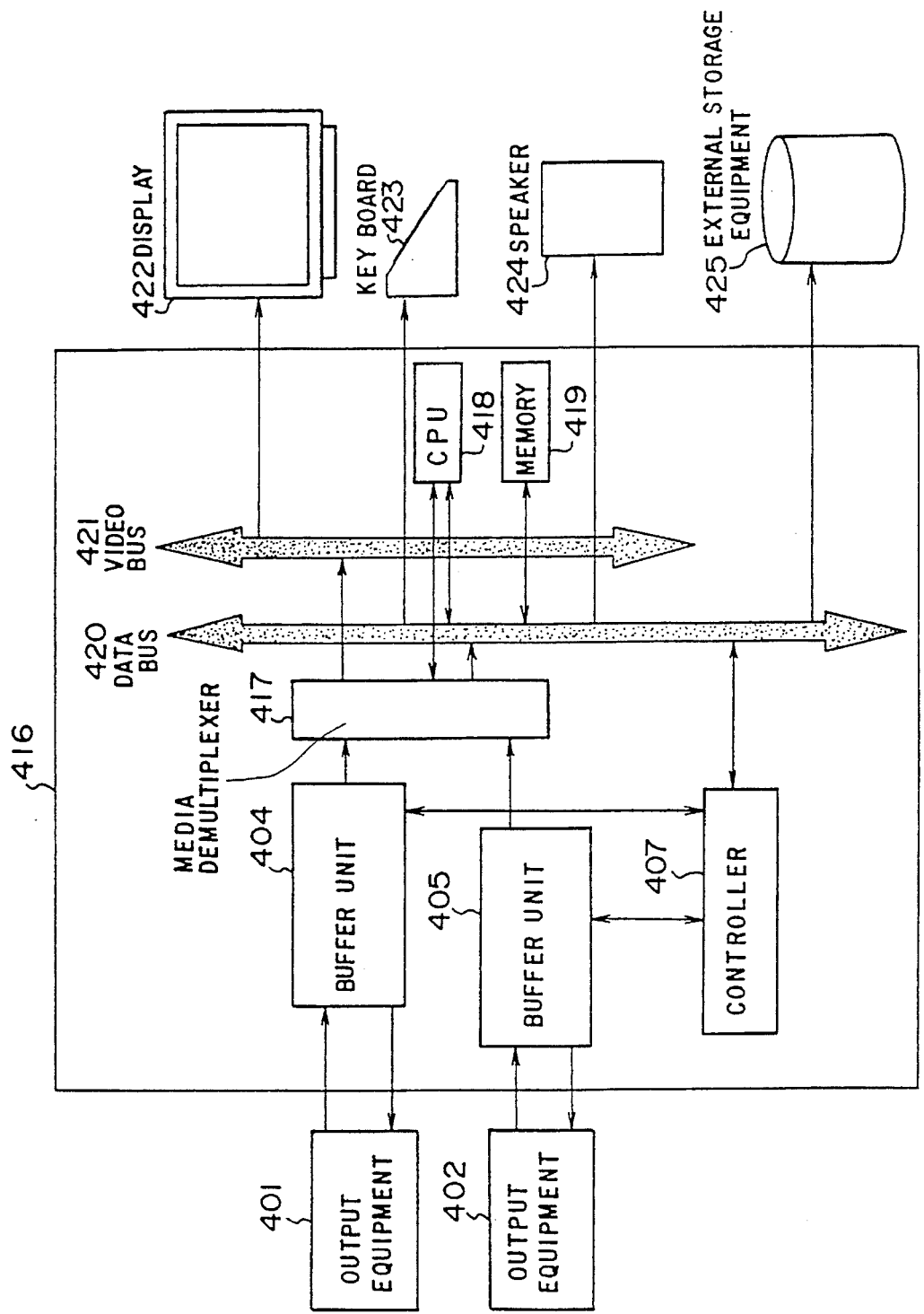

FIG. 24A  ALIGNING ALL INFORMATION

|  | $t_1$ | $t_2$ | $t_3$ | $t_4$ | $t_5$ | $t_6$ | $t_7$ | $t_8$ | $t_9$ |
|---|---|---|---|---|---|---|---|---|---|
| OUTPUT EQUIPMENT | → |  |  | $f_1$ | $f_2$ | $f_3$ | $f_4$ | $f_5$ | $f_6$ |
| BUFFER (A-B) | (1) | (1-2) | (1-3) | (1-4) | (2-5) | (3-6) | (4-7) | (5-8) | (6-9) |
| OUTPUT EQUIPMENT |  |  | →$f_1$ | $f_2$ | $f_3$ | $f_4$ | $f_5$ | $f_6$ |  |
| BUFFER |  |  | (1) | (2) | (3) | (4) | (5) | (6) |  | tm : OUTPUT TIME OF ONE FRAME.  fn : OUTPUT FRAME.  → : ARRIVAL TIME OF OUTPUT INFORMATION.  BUFFER ROW : FRAMES STORED IN BUFFER. (A-B) INDICATES A FRAME TO B FRAME. ONE FRAME MEANS OUTPUT INFORMATION WITH A TIME WIDTH. FOR EXAMPLE, (1-3) INDICATES FIRST FRAME TO THIRD FRAME.

FIG. 24B  REPEATING EARLIER OUTPUT INFORMATION

|  | $t_1$ | $t_2$ | $t_3$ | $t_4$ | $t_5$ | $t_6$ | $t_7$ | $t_8$ | $t_9$ |
|---|---|---|---|---|---|---|---|---|---|
| OUTPUT EQUIPMENT | →$f_1$ | $f_1$ | $f_2$ | $f_2$ | $f_3$ | $f_3$ | $f_4$ | $f_5$ | $f_6$ |
| BUFFER (A-B) | (1) | (1-2) | (2-3) | (2-4) | (3-5) | (3-6) | (4-7) | (5-8) | (6-9) |
| OUTPUT EQUIPMENT |  |  | →$f_1$ | $f_2$ | $f_3$ | $f_4$ | $f_5$ | $f_6$ |  |
| BUFFER |  |  | (1) | (2) | (3) | (4) | (5) | (6) |  | tm : OUTPUT TIME OF ONE FRAME.  fn : OUTPUT FRAME.  → : ARRIVAL TIME OF OUTPUT INFORMATION.  BUFFER ROW : FRAMES STORED IN BUFFER. (A-B) INDICATES A FRAME TO B FRAME. ONE FRAME MEANS OUTPUT INFORMATION WITH A TIME WIDTH.

FIG. 24C  READING OUTPUT INFORMATION EARLIER

|  | $t_1$ | $t_2$ | $t_3$ | $t_4$ | $t_5$ | $t_6$ | $t_7$ | $t_8$ | $t_9$ |
|---|---|---|---|---|---|---|---|---|---|
| OUTPUT EQUIPMENT | →$f_{(n-3)}$ | $f_{(n-2)}$ | $f_{(n-1)}$ | $f_n$ |  |  |  |  |  |
| OUTPUT EQUIPMENT |  |  | → |  | $f_1$ | $f_2$ | $f_3$ | $f_4$ | $f_5$ |
| BUFFER (A-B) |  |  | (1) | (1-2) | (1-3) | (2-4) | (3-5) | (4-6) | (5-7) | tm : OUTPUT TIME OF ONE FRAME.  fn : OUTPUT FRAME.  → : ARRIVAL TIME OF OUTPUT INFORMATION.  BUFFER ROW : FRAMES STORED IN BUFFER. (A-B) INDICATES A FRAME TO B FRAME. ONE FRAME MEANS OUTPUT INFORMATION WITH A TIME WIDTH.

STORAGE BY INTACT INFORMATION

STORAGE BY INFORMATION COMPRESSION

STORED INFORMATION WITH DIFFERENT COMPRESSION RATE

EMPTY PORTION          OCCUPIED PORTION

STORED INFORMATION WITH NORMAL COMPRESSION RATE

EMPTY PORTION          OCCUPIED PORTION

STORED INFORMATION WITH LOWER COMPRESSION RATE

EMPTY PORTION     OCCUPIED PORTION tm: OUTPUT TIME OF ONE FRAME.
fn: n-TH OUTPUT FRAME.   ⇨: REQUIRED TIME OF INFORMATION.
→: ARRVAL TIME OF OUTPUT INFORMATION.
BUFFER ROW: FRAMES STORED IN BUFFER. (A-B) INDICATES A FRAME
            TO B FRAME STORED IN BUFFER. ONE FRAME MEANS
            OUTPUT INFORMATION WITH A TIME WIDTH. FOR EXAMPLE,
            (I-n) INDICATES FIRST FRAME TO N-TH FRAME STORED
            IN BUFFER.

MULTI-MEDIA SERVER FOR TREATING MULTI-MEDIA INFORMATION AND COMMUNICATION SYSTEM EMPOLYING THE MULTI-MEDIA SERVER

CROSS REFERENCE TO RELATED APPLICATION

This application relates to U.S. Pat. No. 4,937,784 entitled "Distributed Interactive Processing System" (which corresponds to JP-A-62-284455) assigned to the present assignee.

BACKGROUND OF THE INVENTION

1. Field of the Invention

The present invention relates to a multi-media server for treating multi-media information including a video and voice and a communication system employing the multi-media server, and more particularly to the multi-media server which is suitable for the application and the system architecture for the multi-media information, a mail system utilizing a video and an application for editing a document and the communication employing the multi-media server.

2. Description of the Related Art

A communication system utilizing a video has been conventionally disclosed in JP-A-61-159886.

The conventional system is designed to install a communication control unit for collecting lines from a plurality of terminals and an image file connected to the communication control unit so that users can directly access the image file from respective terminals. Hence, the two or more user terminals share the image file for storing image information.

The conventional communication system operates to retrieve and read data from the shared image file during communication between two video-based terminals, transfer the data to the data-requesting terminal, and display on the terminal. The system can realize sharing of the image file, though it cannot be adapted to the system providing the combination of video-storing and -editing functions, for example, a video mail system. This prior art, hence, is not capable of editing and working an video itself.

SUMMARY OF THE INVENTION

It is a first object of the present invention to provide network architecture and a user terminal which includes a multi-media server capable of editing and working multi-media information containing video information and voice information and a communication system having the multi-media server.

In order to edit and work the video and voice information, it is necessary to provide a high-speed and large-volume storing device and a high-speed signal processing device. Those devices, however, are more costly than each user terminal. It is thus difficult to provide these devices at each user terminal in light of the cost. The present invention is designed to implement such a system as providing both a high-speed and large-volume storing function and a high-speed signal processing function. The problems to be solved are:

(1) Reduction of a file volume and a processing scale of each user terminal, (2) Suppression of traffic of a network, (3) Inter-connection of user terminals having respective attributes in a network, and (4) Controlling transfer of real-time information It is a second object of the present invention to provide a system for synchronizing two or more pieces of information in case of editing or working multi-media information on a terminal by using two or more output equipments such as video or voice equipment or systematically displaying an X-ray or information sent from medical equipment like a ultrasonic wave diagnosing apparatus, and a synchronization control system employing the synchronizing system. To synchronize two or more pieces of information, all the pieces of information are required to enter into apparatus for integrating them. However, each output equipment has the corresponding time taken from a request-issuing time point to an information-receiving time point. Hence, it is impossible to synchronize the pieces of information if requests are issued to two or more output equipments at a time. To overcome such disadvantage, there are the following problems to be solved in the present invention;

(1) Synchronization of pieces of information obtained in response to requests for information given to two or more output equipments, (2) Holding of information received earlier than the other information, and (3) Assurance of quality of information to be outputted during a synchronizing period To achieve the first object, the present invention provides a real-time storing device and a signal processing device (hereafter, referred to as a multi-media serve) for multi-media data containing video and voice information within a network including two or more user terminals connected therein so that two or more users on the corresponding terminals can share the multi-media server. Thus, because of sharing of a cache and a work area, the required scale of those elements can be reduced, and because of sharing of a file system, operation and management of the file can be facilitated and unified.

The sharing of resources results in the increase of traffic and a file volume in a network. To suppress such increase, the data for each media is compressed on a transmission path or a file, thereby allowing the number of equal user terminals contained in the network to be increased. For the purpose, it is necessary to provide a coder and a decoder for each media on each user terminal and the multi-media server. The coder and the decoder serve to compress the data.

On the assumption that two or more user terminals connected in a network have the respective attributes, the coder and the decoder provided on the multi-media server operate to set a mode matching each attribute of a sending terminal and a destination terminal. An editing process is carried out in the storing device and the signal processing device included in the multi-media server. Since the editing process is non-linear in respect of time and space, the multi-media server includes means for processing an output signal of the decoder corresponding to the coder of the sending terminal.

For controlling transfer of real-time information, on the other hand, the multi-media server includes means for rapidly reproducing real-time information, and each user terminal includes a first buffer operating at a transfer speed of the network and a second buffer operating at a speed of encoding the real-time information so as to transfer data to two or more user terminals as well as reproduce data at two or more user terminals at a time.

In order to carry out the second object, it is necessary to provide a buffer device corresponding to an output device on each user terminal. The buffer device operates to store the information received earlier and control the output depending on the arrival situation of the necessary information for the purpose of synchronizing the necessary pieces of information. Further, in order to suppress increase of information stored in the buffer device, there is provided information compressing means corresponding to the stored amount of each piece of information. The information compressing means serves to increase the amount of information to be stored in the buffer device.

For controlling the output of information stored in the buffer device, on the other hand, there is provided a control device for managing the output pieces of information. The control device serves to control the output for assuring the quality of information output during the synchronization.

The communication system according to the present invention is capable of editing and working the multi-media data in response to an instruction given from any user terminal connected in the network and transferring the resulting data to any user terminal.

The operation of the present invention will be described with reference to FIGS. 1 to 3B.

FIG. 1 shows a communication system including a network 1 for transmitting and exchanging multi-media information such as video, still picture, text, and voice and two or more user terminals 2 to 4 providing input and output functions for multi-media information. The communication system further includes a multi-media server 9, which serves to reduce the load of a file volume and a processing amount applied on the user terminal. The multi-media server 9 is composed of a communication interface unit 5, a real-time signal processing unit 7 and a file 8, both of which are used for editing or working the data for each terminal, and a control unit 6 for controlling the real-time signal processing device 7 and the file 8.

The communication interface unit 5 serves to send or receive a protocol required for communicating with a user terminal. The signal processing unit 7 operates to encode or decode the multi-media information such as video, voice, and a still image, handle a time axis, and edit and work an image or voice. The file 8 serves to store received data and edited data. The control unit serves to write or read data from the file and control the edition of the data.

The present communication system is capable of compressing stored data and transmitted data so as to allow the multi-media server to be shared by each user terminal. The data compressing results in effectively utilizing the file and the network. The arrangements of the user terminal and the multi-media server are shown in FIGS. 2 and 3A. In FIG. 2, the user terminal 2 includes an I/O control unit 20 for each media, a CODEC 21 for compressing and expanding the data, and a communication interface 21. The user terminal 2 serves to send or receive the data to or from the network.

The multi-media server, on the other hand, provides in the signal processing device 7, a decoder 71, an edition processing unit 72, and a coder 73, which are selected depending on the processing content of the user terminal. As will be appreciated from the components, the multi-media server 9 operates to decode data sent from the terminal, edit the data, encode the edited data, and write the encoded data in the file 8. During the operation, the communication interface unit 5 serves to control a data path depending on the processing content of the user terminal. That is, two direction-control switches 52 and 53 are provided between a protocol processing unit 51 and the signal processing unit 7 so that the switches 52, 53 serve to define a predetermined path depending on collection, edition and playback of the data.

For the collection, the data received from the network is sent from the protocol processor 51 to the file 8 as leaving it intact. For the edition, the data read from the file 8 is fed back to the file 8. For the playback, the data read from the file 8 is sent as transmitted data to the network. FIG. 3B shows how the two direction-control switches are operated in the communication switch 5. For four combinations of the switches, "inhibit", "record & playback", "editing", and "playback" are defined. The direction-control switches 52, 53 are set depending on a terminal request.

These switches are set to perform an intended function based on a mode identifier of the sending terminal.

To control transfer of read-time information between a user terminal and a multi-media server, the multi-media server serves to reproduce the data stored therein at the same speed as the transfer speed of the network and transfer the reproduced data to one frame of double frame buffers provided on the terminal through the network. On the terminal, the data is read from the other one of the double buffer frames at a proper speed of the real-time information and is reproduced. This operation makes it possible to enhance a utilization efficiency of the network as reducing a transfer time of data to each terminal.

The general measures for achieving the second object of the present invention will be described with reference to FIGS. 4 to 6. In FIG. 4, 401 to 403 denote output equipments for outputting the respective pieces of voice or video information. 404 to 406 denote buffer units and 407 denotes a controller. The buffer units 404 to 406 and the controller 407 are provided for synchronizing the information sent from the output equipments 401 to 403. The output equipments 401 to 403 are respectively connected to the buffer units 404 to 406, which are also connected to the controller 407. The output equipments 401 to 403 supplies respective pieces of information to the buffer units 404 to 406 in response to the corresponding control signals sent from the controller 407. As shown in FIG. 5, the buffer unit 404 includes a detector 408 for detecting the information supplied from the output equipment, a compressor 409 for compressing the information supplied from the output equipment, a frame memory 410 for storing the information or the compressed information, an expander 411 for restoring the information stored in the frame memory 410 in expanded form, a detector 412 for detecting the information sent from the expander 411, and a buffer control unit 413 for controlling the detector 408, the compressor 409, the frame memory 410, the expander 411, and the detector 412. The buffer controller 413, as shown in FIG. 6, includes a counter 414 and a processor 415. The counter 414 serves to count up in response to a signal sent from the detector 408 and count down in response to a signal sent from the detector 412. The processor 415 serves to control the compressor 409, the frame memory 410, and the expander 411 depending on the count value of the counter 414 and the state of the frame memory 410.

The present system is capable of synchronizing respective pieces of information as controlling the storage and output of the information. Then, the description will be directed to how to retain the information as shown in FIG. 4. At first, the controller 407 sends a control signal for reading information to the buffer unit 404. The buffer unit 404 sends out a control signal for requesting output of information to the buffer unit 404. In response to the control signal, the output equipment 401 outputs the information to the buffer unit 404. The buffer unit 404 receives the information sent from the output equipment 401 and holds the information retained until the buffer unit 404 receives the control signal for requesting output of information sent from the controller 407. Then, the description will be directed to how the buffer unit 404 stores the information with reference to FIG. 5. The buffer control unit 413 included in the buffer unit receives a control signal for requesting information sent from the controller 407, converts the control signal into the control signal of the output equipment 401, and sends to control signal to the output equipment 401. Then, the detector 408 serves to detect the information inputted to the buffer unit itself and send it to the buffer control unit 413. At a time, the detector 408 serves to send the detected information to the compressor 409. The compressor 409 sends the information or the compressed information to the frame memory 410 in response to the control signal sent from the buffer control unit 413.

Next, the description will be directed to how the buffer unit outputs the information with reference to FIG. 4. At first, the controller 407 sends out a control signal for requesting an output to the buffer unit 404. In the operation of the buffer unit 404, as shown in FIG. 5, the buffer control unit 413 receives a control signal for requesting output of information from the controller 407 and send a control signal for requesting output of information to the frame memory 410. In response to the control signal, the frame memory 410 sends the information or the compressed information to the expander 411. The expander 411 serves to expand the information if compressed and output it to the detector 412, from which the detected information is sent out of the buffer unit. The detector 412 sends to the buffer control unit 413 a signal for obtaining the amount of information inputted from the output equipment when the detector 412 detects the information.

The foregoing information-retaining and -outputting operations apply to the output equipments 402 and 403 and the buffer units 405 and 406.

BRIEF DESCRIPTION OF THE DRAWINGS

FIG. 6 is a block diagram showing arrangement of a buffer control unit included in the invention;

FIGS. 7A, 7B, 7C are block diagrams showing mode settings of a coder and a decoder included in a terminal or a server, respectively;

FIG. 8 is a diagram showing a data format when data is transferred between an terminal and a server;

FIG. 9 is a diagram showing an encoding system of each media;

FIGS. 11A, 11B, 11C are diagrams for explaining the operations of a concurrent processing system executed in the server;

FIGS. 12A and 12B are diagrams for explaining the transfer modes in a high-speed transfer system executed in a multi-head;

FIG. 15 is a block diagram showing architecture of the terminal;

FIG. 16 is a block diagram showing arrangement of a terminal having an editing file;

FIG. 19 is a diagram showing inter-field tables of the multi-media data;

FIG. 23 is a block diagram showing arrangement of the terminal according to an embodiment of the invention;

FIGS. 24A, 24B, 24C are time charts showing how information is synchronized by the synchronization control method of the invention;

DESCRIPTION OF THE PREFERRED EMBODIMENTS

Figure 1:
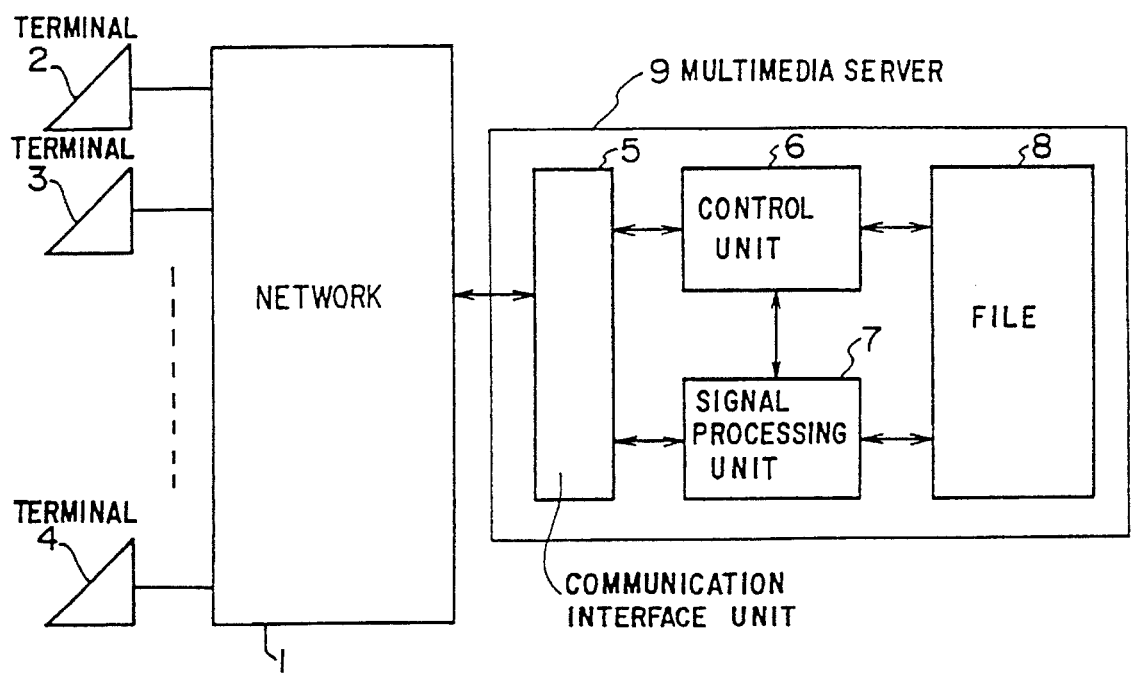
FIG. 1 is a block diagram showing an overall arrangement of a network to which the present invention is applied.
Figure 2:
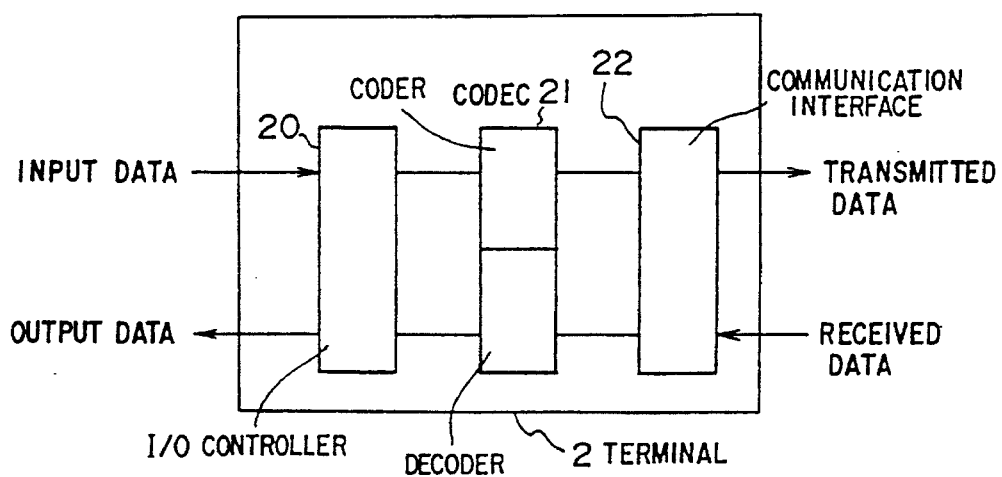
FIG. 2 is a diagram showing arrangement of a user terminal.
Figure 3:
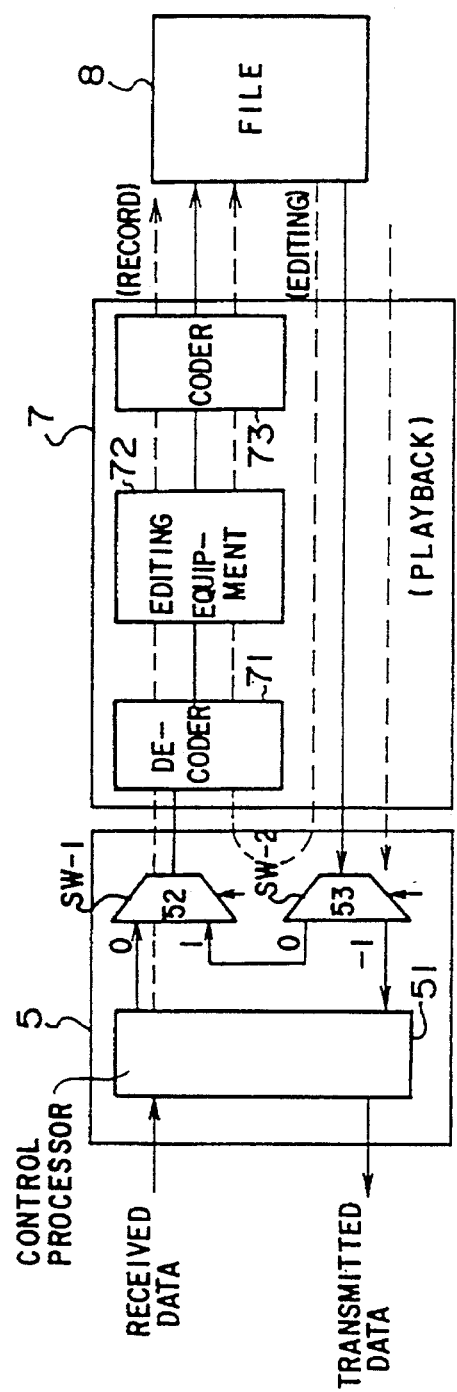
FIG. 3A is a diagram showing arrangement of a multi-media server.
FIG. 3B is a diagram showing states of a direction-control switch included in the multi-media server.
Figure 4:
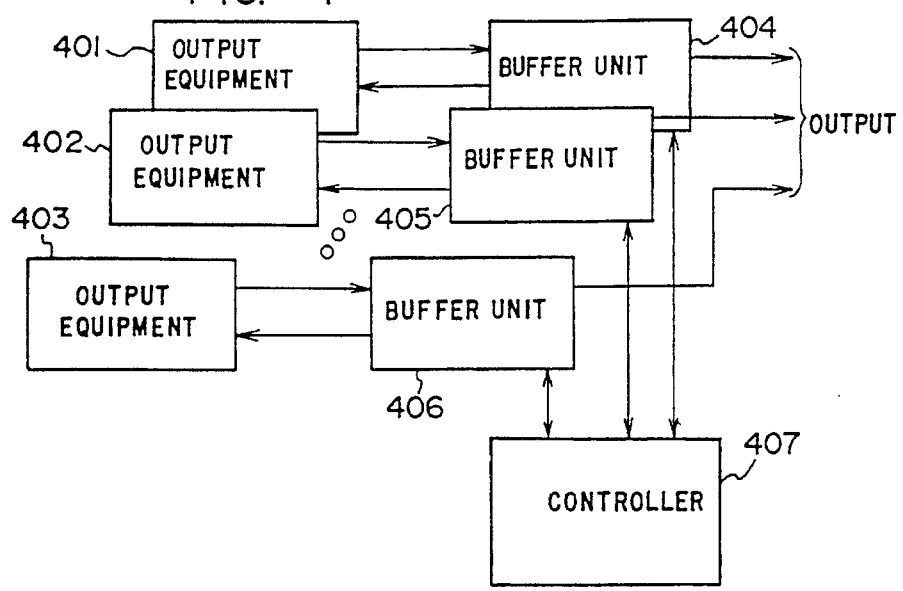
FIG. 4 is a block diagram showing arrangement of a synchronization processing unit included in the invention.

FIGS. 7A–7C show in block diagram, an embodiment of the present invention. As shown, 5 denotes a communication interface unit, which serves to decode data sent from a network 1 and extract a sending address α (corresponding to a user terminal 2) and a receiving address β (corresponding to a user terminal 4). These address information pieces are inputted to a control unit 6. The control unit 6 operates to determine a mode of a decoder 71 corresponding to α and a mode of a coder 73 corresponding to β by referring to tables 61 and 62 and output the results to the mode control units of the decoder and the coder.

TABLES 61, 62

| # | Terminal Address | Coding Method |
|---|---|---|
| 1 | 001 | MPEG |
| 2 | 002 | H.261 |
| 3 | 003 | DPCM |
| . | . | . |
| . | . | . |
| . | . | . |

In the tables 61 and 62, the statuses of the coder and the decoder in each terminal contained in the network are registered in a manner to correspond to all the medium. The attribute of a user terminal is registered in either of the tables each time the user terminal is connected to a network or the user terminal accesses the multi-media server.

In this embodiment, there is considered that the intra-network communication is executed between the user terminals having the same attribute or between the user terminals having respective attributes. For the former communication, as shown in FIG. 7B, in the case where a data is transferred from the user terminal 2 having a coder with an attribute C1 to the user terminal 4 having a decoder with an attribute D1, the decoder 71 of the multi-media server is set to D1 for C1 and the coder 73 of the multi-media server is set to C1 for D1.

For the latter communication, as shown in FIG. 7C, the decoder and the coder of the multi-media server are respectively set to D1 and C2 in a manner to correspond to the user terminal 2 having a coder of C1 and the user terminal 4 having a decoder of D2.

Turning to FIG. 8, it is shown a data format based on which a data is transferred from a user terminal to the multi-media server. An application header is applied to the data for controlling the multi-media server. The application header is configured into a source address identifier, a destination address identifier, and a mode identifier.

The mode identifier contains a write (record), a read (playback), write and read (record and playback), and an editing modes, on which the user terminal can control the status of the multi-media server.

The "editing" mode further contains a media mode and a speed mode, on which the user can freely edit the data stored in the file 8 of the multi-media server from the terminal. At the "media" mode, it is possible to specify all the medium or a unique media. At the "speed" mode, it is possible to specify the number of frames or samples per second so that the user can remotely control edition of the real-time information such as video or voice from the terminal. (It is unnecessary to specify the "speed" for bit-map or text information). For example, in the case where it is desired to edit the NTSC video information at a slow mode, the "speed" mode should be specified as 1 to 30 frames per second. In the case where it is desired to edit the NTSC video information at a fast mode, the "speed" mode should be specified as 30 or more frames. The "specified information" required for the edition is transmitted as it is contained in the remaining part of the application header.

Next, FIG. 9 shows a coding system of the user terminal attributes to be defined by the source address identifier and the destination address identifier shown in FIG. 8. The coding system is defined for each media, that is, the video, the voice, and the still image and is selected according to the traffic state of the network and the file volume. In FIG. 9, the server provides four kinds of banks for the coder and decoder according to each media.

Figure 10:
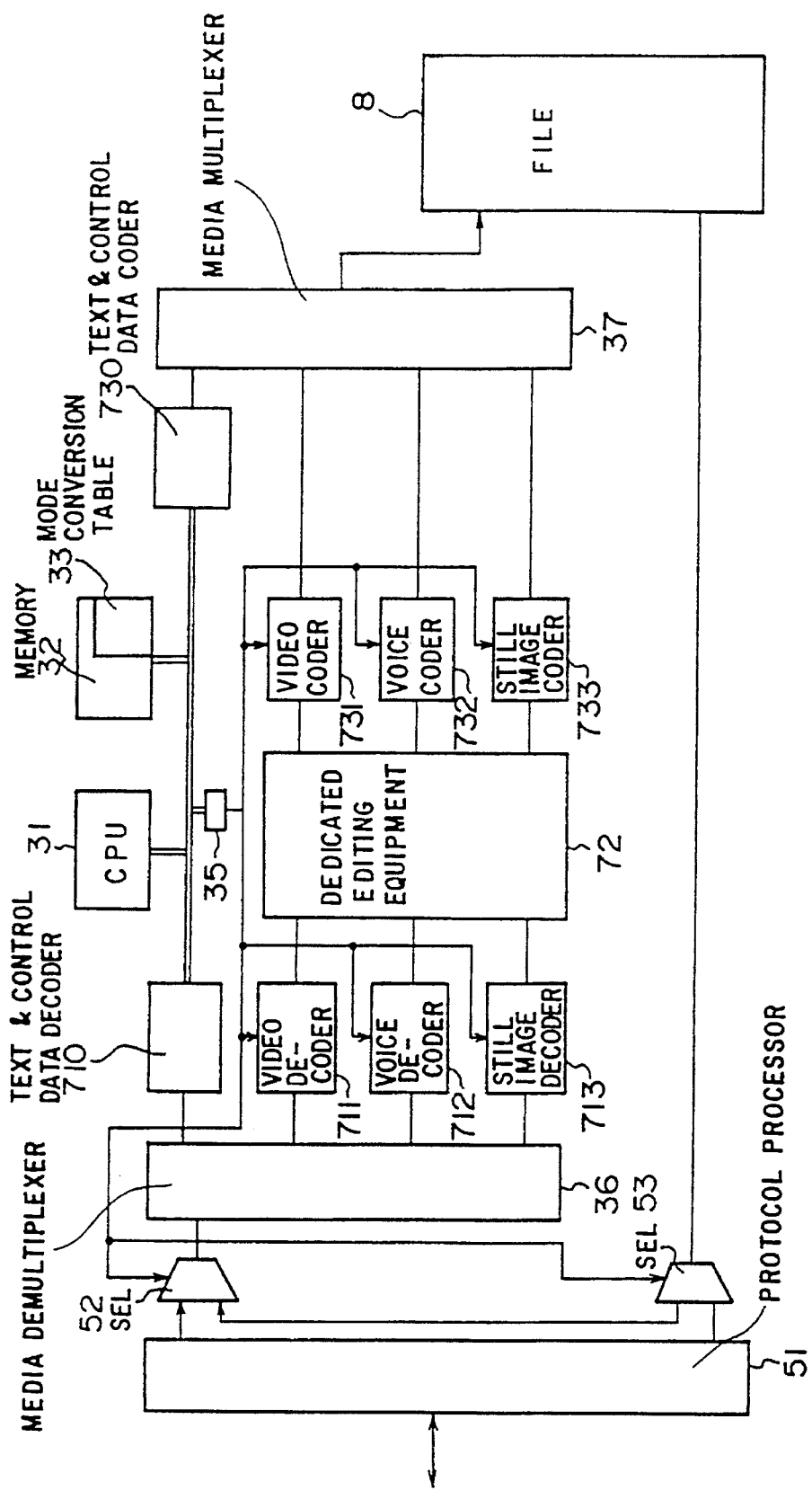
FIG. 10 is a block diagram showing architecture of the server.

The concrete arrangement of FIG. 7 is shown in FIG. 10. In the Figure, a numeral 51 denotes a protocol processor which receives data sent from the network. The data is inputted into a direction control switch 52 through the protocol processor 51 and then into a media demultiplexer 36 in which the data is demultiplexed. Each demultiplexed data is sent to a text and control decoder 710, a video decoder 711, a voice decoder 712, and a still image decoder. The video, the voice and the still image required for signal processing are passed through a dedicated editing equipment providing an ALU (Arithmetic Logical Unit) and a multiplexer and having a real-time processing function and are inputted to the corresponding encoders 731, 732, 733. The text and control data, on the other hand, is sent from the text and control decoder 710 to a CPU 31, a memory 32 and a test and control data coder 730 through a bus 34. In the memory 32, a mode conversion table 33 for the coder and the decoder is referenced on the content of the received control data. The processing result of the mode conversion table 33 is outputted through a peripheral interface 35. The CPU 3 determines the kind of the mode identifier and outputs the result to the direction control switch. The data processed through the foreogoing flow is inputted to a media multiplexer 37 in which each data is integrated. The media multiplexer 37 sends the integrated data to the file 8. In reading the data, the data read from the file 8 is inputted to the protocol processor 51 through the direction control switch 53. The protocol processor 51 outputs the processed result to the network.

FIGS. 11A to 11C show a second embodiment of the invention. FIG. 11A shows an editing buffer 721 added to an editing equipment 72 included in the server. In response to a request for "editing", the data encoded by the coder C1 is read in the file 8 and is written in the editing buffer 721 (see FIG. 11B). Then, the data is locally edited in the editing equipment and the editing buffer until it is rewritten in the file 8. At a time, this server serves to perform the "reading" of the (data encoded by the coder C4) from the file and the "writing" of the data (the coder C2 of the terminal→the decoder D2 of the server→the coder C3 of the server) in response to the request from another terminal. For the "reading" and "writing" processing, the editing section is separated from a path for executing concurrent processing. Upon termination of the edition, the terminal makes sure that no access from another user terminal is given, inputs the edited data to the coder 73, and writes the encoded data to the file 8.

Figure 13:
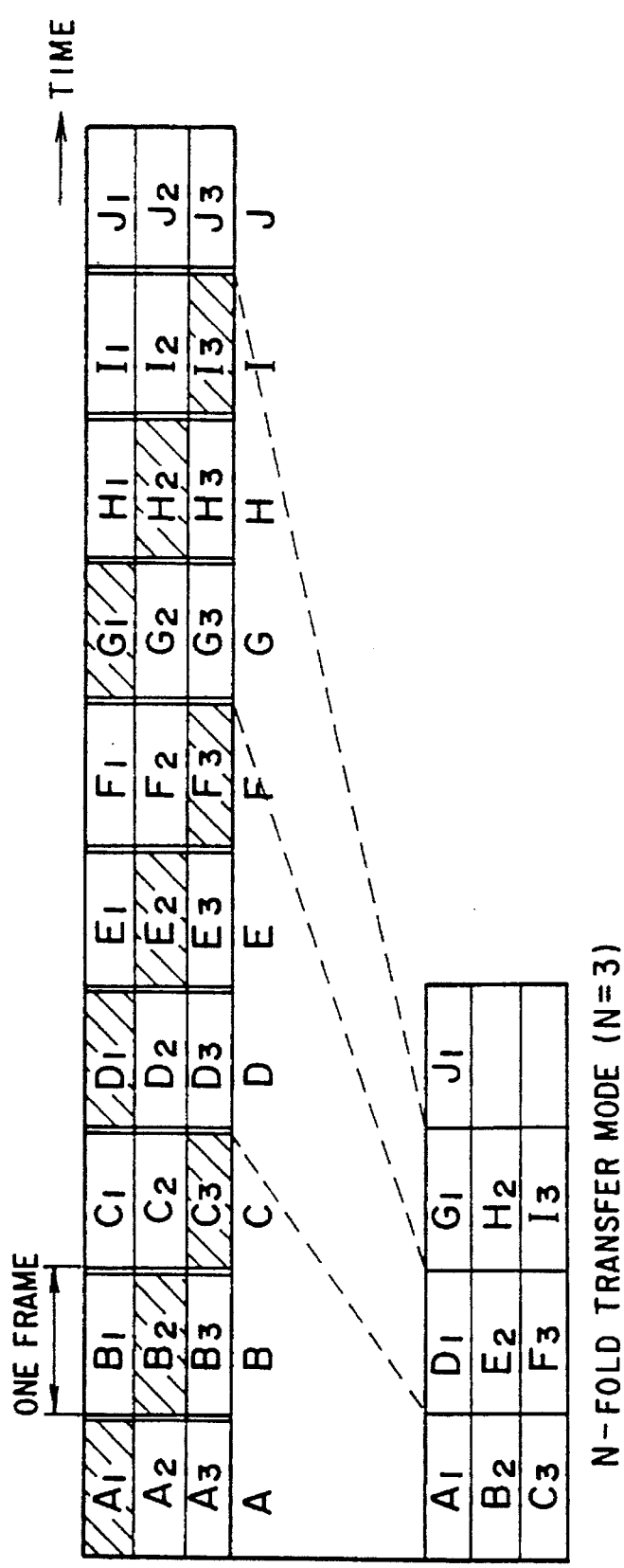
FIG. 13 is a diagram showing a sequential scanning high-speed transfer system.

FIGS. 12A, 12B and 13 show a third embodiment of the present invention. In the case where the user terminal stays at the "editing" or "playback" mode, the multi-media server operates to rapidly reproduce video data stored in the file and retrieve a predetermined scene. For this operation, the multi-media server may take two arrangements, that is, a fast reading system which provides a multi-head in the file for a concurrent reading function and a system for scanning the data stored in the file at regular intervals.

For the former system, N heads, which are individually capable of specifying respective addresses, are arranged in a manner to be shifted one frame by one frame as shown in FIG. 12. Those N heads are cyclically operated to read the data at each of N frames. It results in obtaining N-fold throughput. For this system, there are considered one method for distributing N heads into a unique source as shown in FIG. 12A and the other method for distributing N heads into several users as shown in FIG. 12B. That is, in case fewer user terminals access the multi-media server, more rapid transfer is made possible for a single user. In case more user terminals access the multi-media server, the equal transfer of data is allowed to be supported for all the user terminals. For two or more users, priority is placed on those users so as to change the number of the corresponding heads and the transfer speed of the data to each user terminal.

For the latter system, this system is designed to equally reduce the information amount of the data given at the "playback" mode as keeping a throughput of the file stable. This system is shown in FIG. 13. Each frame A, B, . . . is divided into plural subframes so that ⅓ frame of each frame A, B, C is serially operated to read the data in the sequence of an upper, a middle, and a lower frames and to transfer the read data. Hence, the transferred frame data contains three-frame data such as A1, B2, and C3 mingled therein. However, it results in reducing an access time for a destination frame to ⅓ as compared with the normal access time, that is, achieving high-speed retrieval. To realize this function, it is necessary to specify the "speed" mode in the terminal.

Figure 14A:
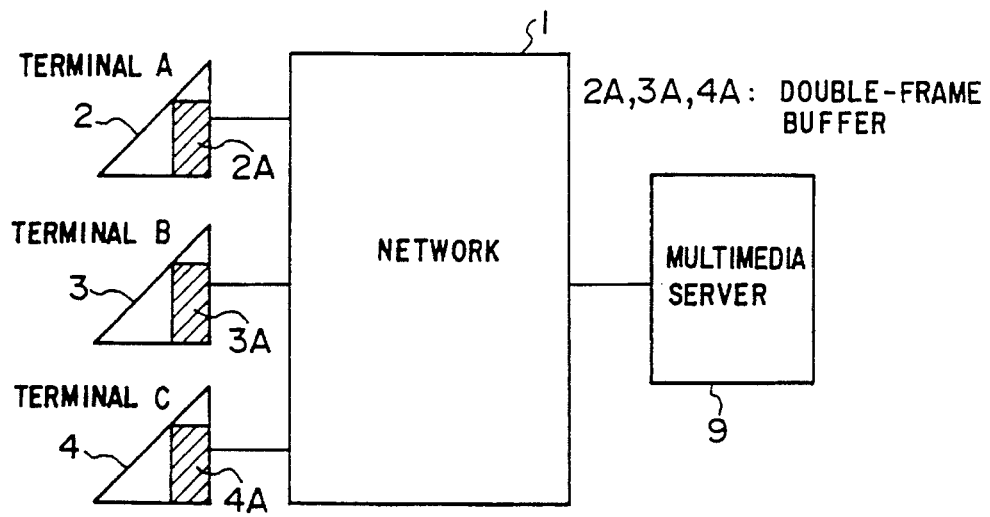
FIGS. 14A and 14B are diagrams for explaining how the data is concurrently transferred in the network.
Figure 14B:
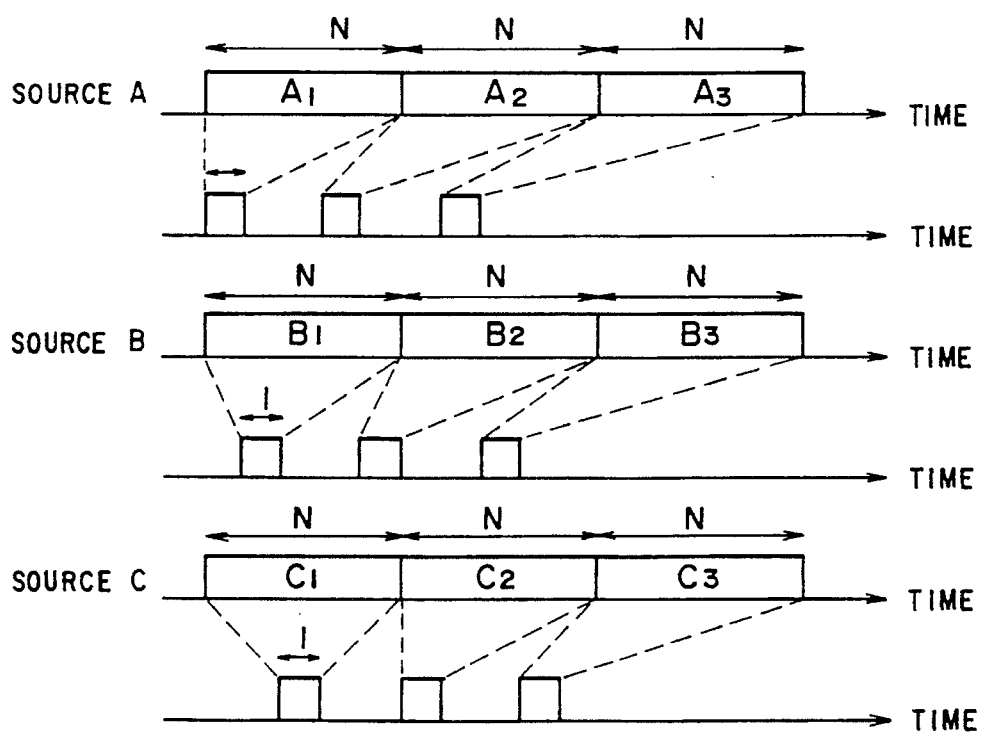

The fourth embodiment of the present invention is shown in FIGS. 14A and 14B. In this embodiment, it is assumed that the real-time information stored in the multi-media server is encoded at a slower speed than the transfer speed of the network. The data stored in the multi-medial server 9 is reproduced at the same speed as the transfer speed of the network and is transferred to the network. Each terminal 2, 3 or 4 has corresponding double-frame buffer 2A, 3A or 4A. The received data is buffered in one of the double buffers in the terminal at the transfer speed of the network and the data is read from the other one of the double buffers at the speed of encoding the real-time information. The two buffers are switched at each period of the data read from the server so as to allow the real-time information to be kept being reproduced. That is, as shown in FIG. 14B, each of three real-time sources A, B, C is divided into N constant time width blocks A1 to A3, B1 to B3, and C1 to C3, each of which is compressed to the data having a time width of 1. Then, the compressed data is transferred as continuous blocks. At a time, on the network, each data A, B, C is shifted time-divisionally and is cyclically transferred at a period of a time width N only if the server manages the time N. The present embodiment thus makes it possible to concurrently transfer the real-time information between the multi-media server and two or more user terminals through the high-speed network.

FIG. 15 shows a fifth embodiment of the present invention. In FIG. 15, concretely, the architecture of the user terminal is shown. The user terminal includes input equipments such as a scanner 100, a camera 101, a microphone 102, a keyboard 103, a CRT 104, and a speaker 105, interface units 106 to 111, a video CODEC 21, a CPU 113, a memory 114, and a communication interface unit 22. Within the user terminal is provided a data bus 117 for transferring data and voice signals and a video bus 116 for transferring a video signal. The CPU performs several processings of handling an event from an input equipment, controlling an output unit, and responding to a request given from a server through the network in cooperation with the memory. The communication interface unit serves to perform protocol processing according to each media characteristic and provide a full-duplex line to the terminal.

FIG. 16 shows a sixth embodiment of the present invention. This embodiment is arranged in the state that the transfer speed of the network 1 is slower than that within the user terminal and the user terminal 2 provides both a source file 201 and an editing file 202. The user terminal accesses the multi-media server through the network if the edition is necessary, edits the data in the editing equipment 72 and the editing buffer 721, and stores the edited result in the editing file 202. In this case, no access is given to the file contained in the server. The data is returned beofe it reaches the file.

Figure 17:
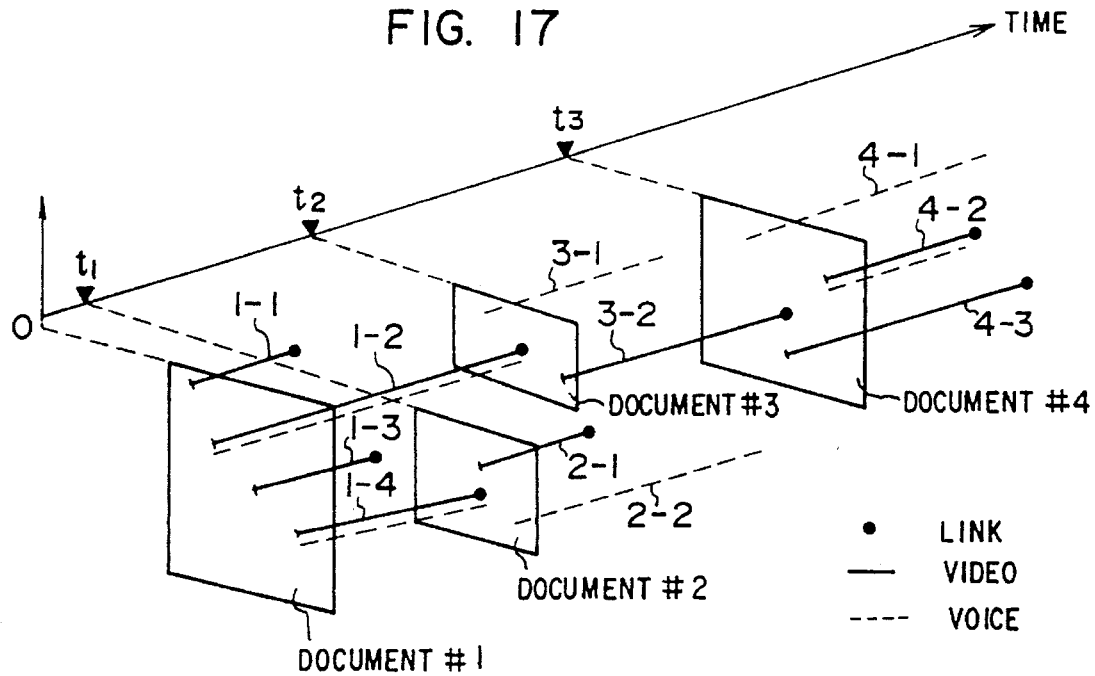
FIG. 17 is a diagram showing configuration of a multi-media document.

FIGS. 7 to 20 show a seventh embodiment of the present invention. The embodiment discloses the multi-media document system including a multi-media server. The description is focused on the file structure of the multi-media document system. FIG. 17 shows the structure of data stored in the file 8 of the multi-media server. The file is configured of documents composed of text and a still image and annotations 1-1 to 4-3 accompanied with the documents. The annotation is composed of voice and video and has any length. Any combination of the annotations is added to any location of the document. The document is linked to the tail of the annotation, resulting in allowing two or more documents to be interconnecting through two or more annotations.

Figure 18:
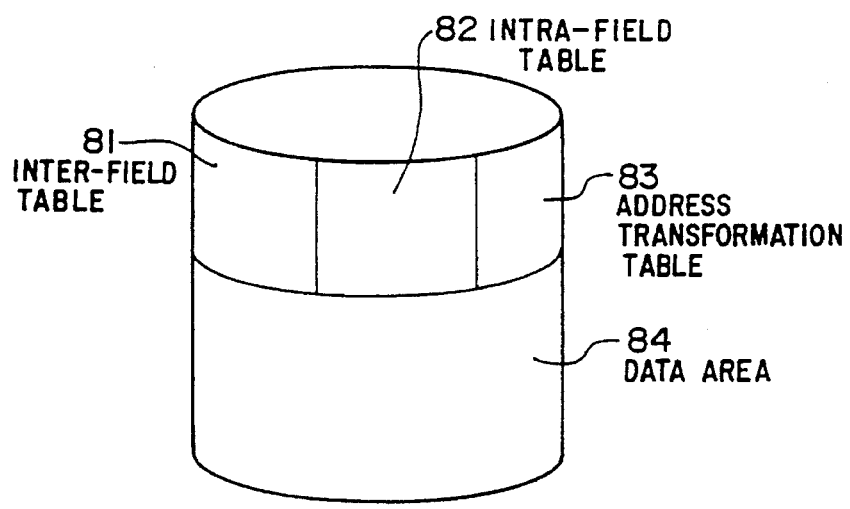
FIG. 18 is a diagram showing a file structure of the multi-media data.
Figure 20:
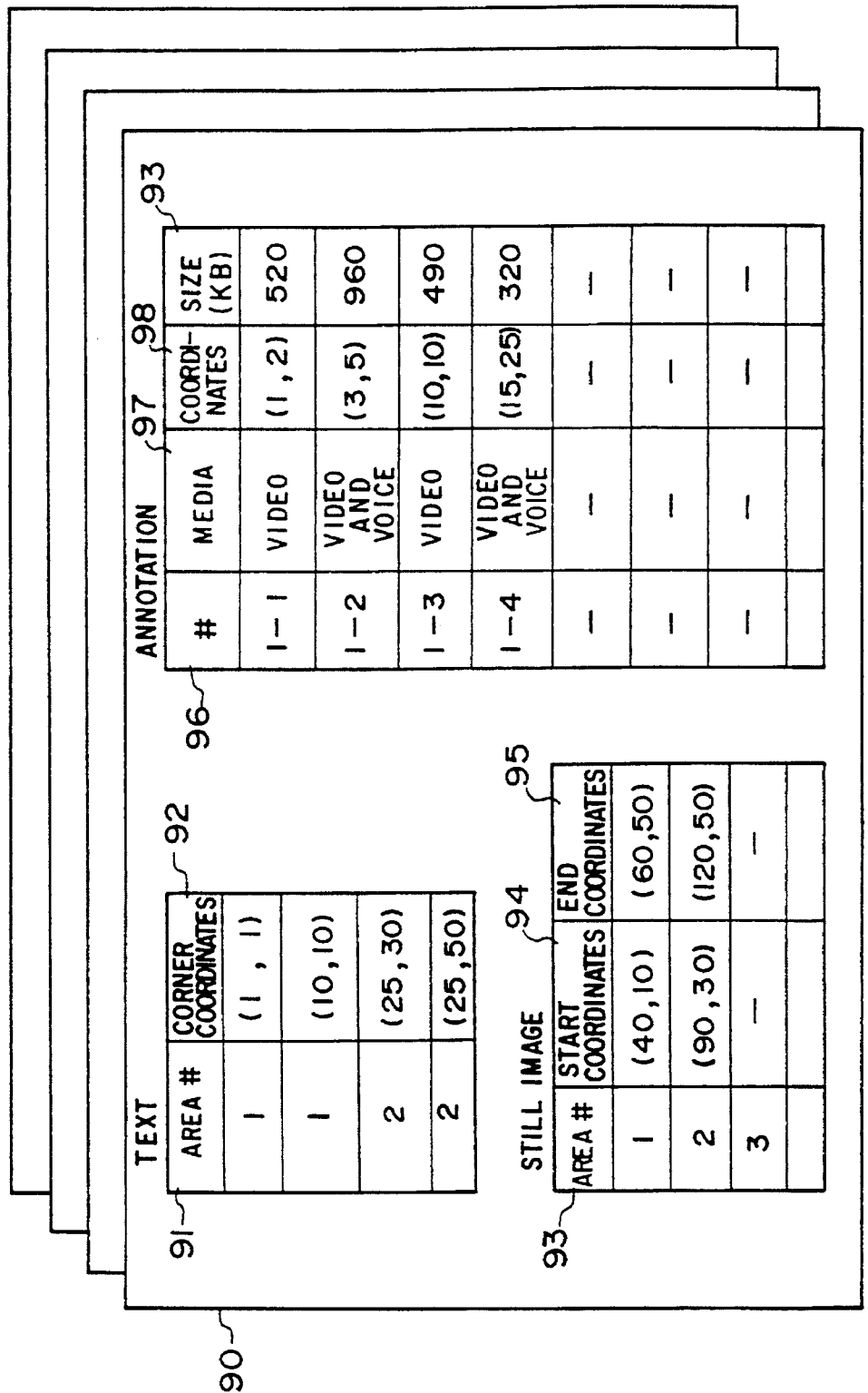
FIG. 20 is a diagram showing intra-field tables of the multi-media data.

FIG. 18 shows a logical format of the data having the foregoing arrangement on the file. The file is composed of an inter-field table 81, an intra-field table 82, an address conversion table 83, and a data area 84. The inter-field table 81 indicates the interconnection among two or more documents contained in a single multi-media data. As shown in FIG. 19, the inter-field 81 is composed of a label field 85 and a nesting field for each document. The nesting field indicates the number of a parent document label and the number of a child document label. Next, the intra-field table 82 indicates text, a still image, and layout information of an annotation within each document. As shown in FIG. 20, the intra-field table includes an area number 91 of text information, a corner coordinate 92 of each area, an area number 93, start coordinates 94, and end coordinates 95 of still image information, a label of annotation information, a media name 97, coordinates 98, and a size 93. Further, 83 denotes a conversion table indicating inter-connection between each data area 84 and the table.

Figure 21:
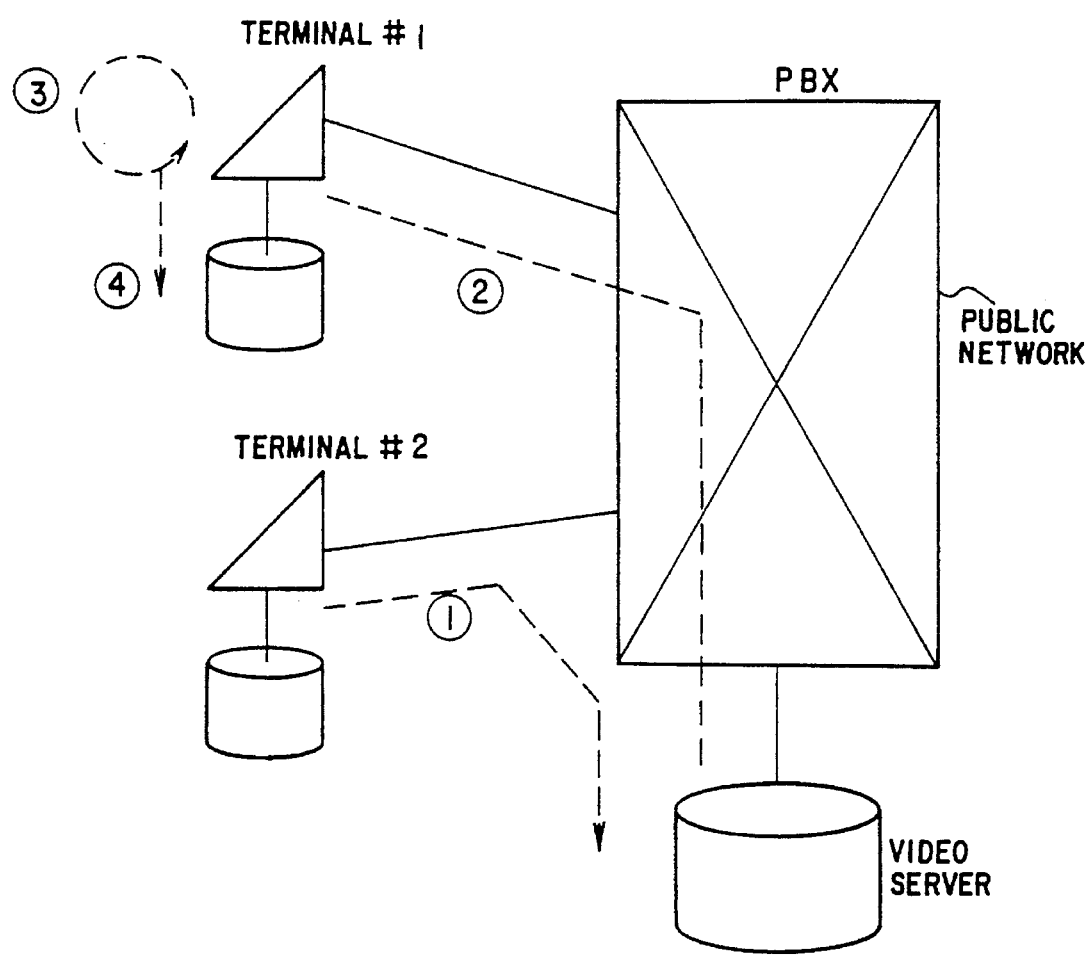
FIG. 21 is a diagram showing how the present invention is applied to a multi-media mail system.

An eighth embodiment of the present invention concerns with the multi-media mail system to which the invention is applied. As shown in FIG. 21, the multi-media mail system is designed so that a video server 21 is connected to a PBX (Private Branch Exchange) accommodating two or more user terminals in a stellate manner and the mail service is carried out within the PBX. The ATM-PBX serves to replace a media with another media as leaving the media as a fixed-length sort packet called as a cell so as to rapidly transfer the data between the user terminals or between the video server and each user terminal. Then, the processing flow to be executed in the processing flow will be described below.

(1) A user terminal #2 serves to write the data in the video server connected to the ATM-PBX from a terminal #2. The coding system used herein suits to the attributes of the source user terminal and the destination user terminal.

(2) The user terminal #1 serves to temporarily reproduce the data stored in the video server. At a time, the user terminal #1 is not required to download the video data in the source terminal.

(3) The user terminal #1 serves to remotely control the server to perform filtering and editing of the data read from the server. The work area and the signal processor used for the processing of the video data are those included in the multi-media server.

(4) The user terminal #1 serves to store as individual information the edited data in the #1 file if necessary.

Figure 22B:
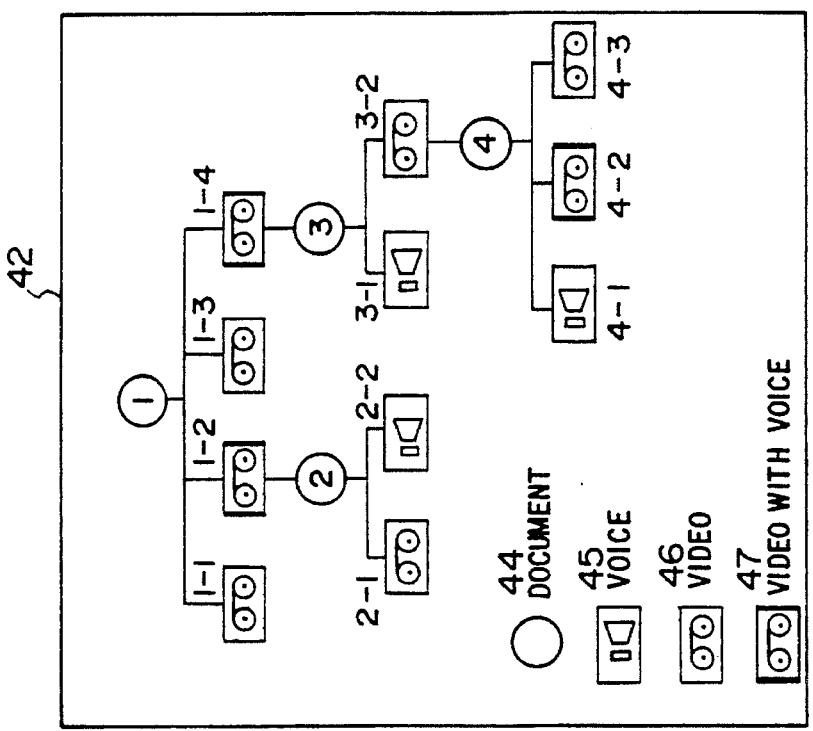
FIGS. 22A and 22B are diagrams for explaining a man-machine interface of the multi-media data.
Figure 22A:
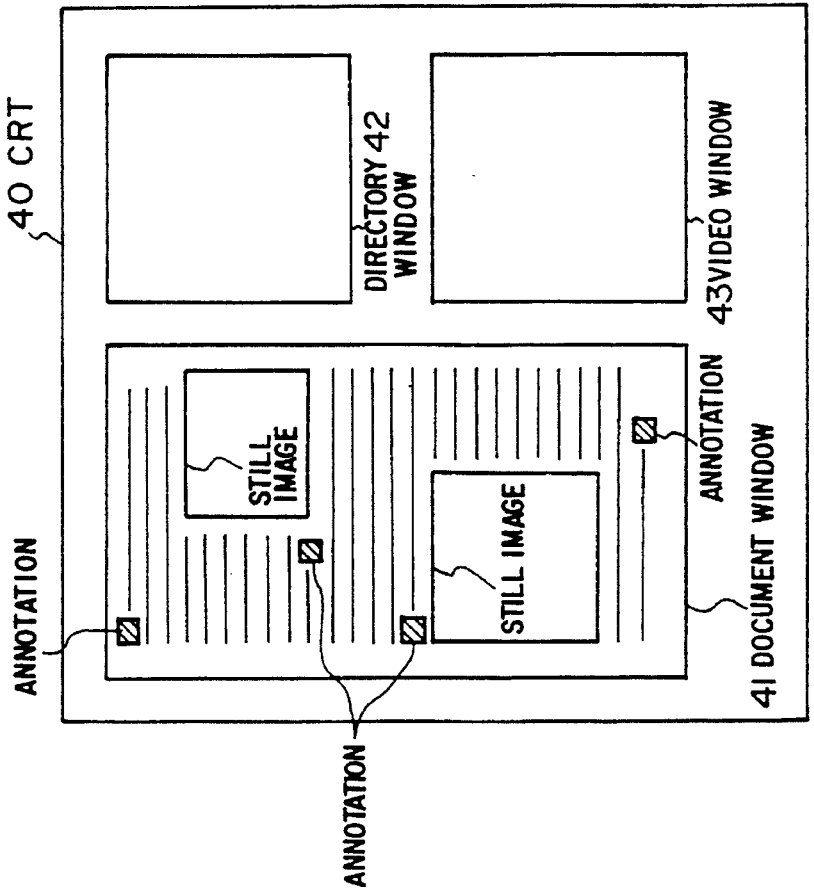

As a ninth embodiment, a man-machine interface on the user terminal of the system having the foregoing file structure is shown in FIGS. 22A and 22B. On a CRT 40 included in the user terminal, there are displayed three kinds of a document window 41, a directory window 42, and a video window 43. The document window 41 contains an annotation mark added thereto for indicating that the video or voice exists in the data (corresponding to the document #1 shown in FIG. 17). A numeral 42 indicates how the document and each annotation 45, 46, 47 are interconnected and the media type of the annotation as shown in FIG. 22B. The video information for the annotation is displayed on a video window 43. Whiel the document or annotation stays at the display or playback mode, it is displayed on the directory window 42. In case a child document is added to the end of the annotation, the child document is displayed on the parent document as another document window at a time when the playback of the annotation is terminated.

The tenth embodiment of the present invention will be described with reference to FIG. 23. The embodiment concerns with a synchronizing equipment for two or more medium on a user terminal and includes output equipments 401, 402, a terminal 416, a display 422, a keyboard 423, a speaker 424, and an external storage equipment 425. The output equipments 401 and 402 serve to send the information specified by the output terminal 416 to the terminal 416 itself. The keyboard 423 is used for handling the terminal 416. The display 422 displays an image sent from the terminal 416. The external storage equipment 425 serves to store the information on which the terminal 416 manages and controls the information obtained from the output equipments. The terminal 416 serves to read the information from the external storage equipment in response to the input done from the keyboard 423 and control the output equipments to synchronize the informations sent from both of the output equipments based on the information, separate the synchronized informations, and output to the display 422 the information if it is video information and to the speaker 424 if it is audio information. The terminal 416 includes buffer units 404 and 405, a controller 407, a media demultiplexer 417, a CPU 418, a memory 419, a data bus 420, and a video bus 421. The buffer units 404 and 405 are respectively connected to the output equipments 401 and 402. The controller 407 serves to control the buffer units 404 and 405 in response to a command from the CPU 418. The media demultiplexer 417 serves to separate the information sent from the buffer units 404 and 405 into video information and voice information and output to the video bus 421 if it is video information and to the data bus 420 if it is the other information. The CPU 418 controls the I/O depending on the content of the memory 419. The memory 419 stores the information sent from the external storage equipment, on which information the CPU 418 controls the I/O. The terminal 416 starts to operate in response to the input done from the keyboard 423. Within the terminal, the CPU 418 receives the input sent from the keyboard 423 through the data bus 420, analyze the input, and selectively pick up the control information from the memory 419 depending on the analyzed result. If no control information corresponding to the analyzed result can be found, the necessary information is read from the external storage equipment 425 to the memory 419 and then select the corresponding control information again. The selected control information is sent to the controller 407 through the data bus 420. The controller 407 decodes the control information sent from the CPU 418 and selectively sends the corresponding information to each buffer unit. In response to the control information, the buffer unit serves to pick up the control information corresponding to the output equipments and send the corresponding control information to the output equipment and the information stored in the buffer unit itself to the media demultiplexer 417. The information sent from the buffer unit to the media demultipelxer 417 is separated into video and voice. The video and voice information pieces are respectively inputted to the display 422 and the speaker 424 through the data bus 420 and the video bus 421.

The embodiment makes it possible to supply a synchronizing method from the external equipment such as a memory or an external storage equipment to the controller 407, thereby allowing various synchronizing methods to be used. Moreover, the embodiment may apply to various output sequences only if the output sequences are inputted to the external storage equipment together with the synchronizing methods.

FIGS. 24A–24C show an eleventh embodiment of the present invention which concerns with a synchronizing method to be performed in the tenth embodiment. As shown in FIG. 24A, the buffer unit 404 continues to store a piece of information received earlier than the other pieces of information until all the information is received and starts to output the information when all the information is received. In one method for the operation, the detector 408 shown in FIG. 6 serves to detect the arrival of the information to the buffer unit and send a signal to the buffer control unit 413. In response to the signal sent from the detector 408, the buffer control unit 413 sends to the frame memory 410 a control signal for requesting an output. In the other method for the operation, as shown in FIG. 24B, at first, the buffer unit 404 serves to output the piece of information received earlier than the other to the frame memory. Then, the frame memory outputs the piece of information received earlier again depending on the arrival state of the other pieces of information to the buffer unit 405. That is, the earlier received information is lagged for synchronizing the information. In operation, the detector 410 shown in FIG. 6 serves to detect arrival of the information to the buffer unit 404 and send a signal to the buffer control unit shown in FIG. 5. The counter 414 counts up the signal and sends the count value to the controller 407. The controller 407 serves to compare a count value of one buffer unit with that of another buffer unit, send a signal indicating whether or not the synchronization is properly done to the buffer control unit 413. In response to the signal, the processor 415 included in the buffer control unit 413 sends to the frame memory 410 a control signal for requesting an output if the processor 415 grasps that the synchronization is properly done based on the signal. If, on the other hand, the synchronization is not properly done and the frame memory 410 does not still iteratively output the information, the processor 415 sends to the frame memory 410 a control signal for requesting iterative output. If the frame memory 410 starts to output the information, the next information is requested to be outputted. In case the buffer unit 405 has more empty volume and it is requested to obtain the information from the output equipment 402 connected to the buffer unit 405, as shown in FIG. 24C, the buffer unit 405 can read the information in advance before the information becomes necessary for the purpose of reducing to zero a lag time between when the information request is issued and when the information reaches the buffer unit 405. In this method, the controller 407 serves to read the status of the buffer unit 405 for determining whether or not the buffer unit 405 can read the information in advance. The status of the buffer unit 405 indicates a difference between a value of the counter 415 located in the buffer control unit 413 and the allowable number of frames in the frame buffer 410. The controller 407 serves to send to the buffer unit 405 a control signal for reading information to be read in advance. The embodiment makes it possible for the user to employ the synchronizing method according to his or her will.

Figure 5:
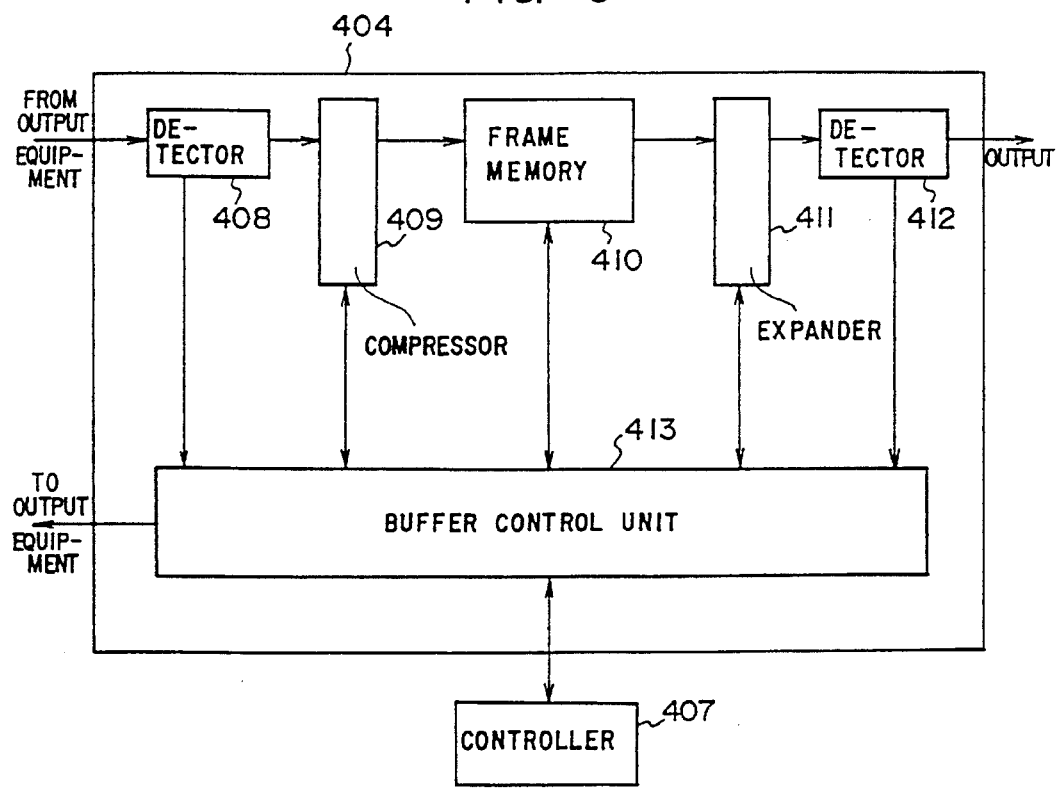
FIG. 5 is a block diagram showing arrangement of the buffer unit included in the invention.
Figure 25A:
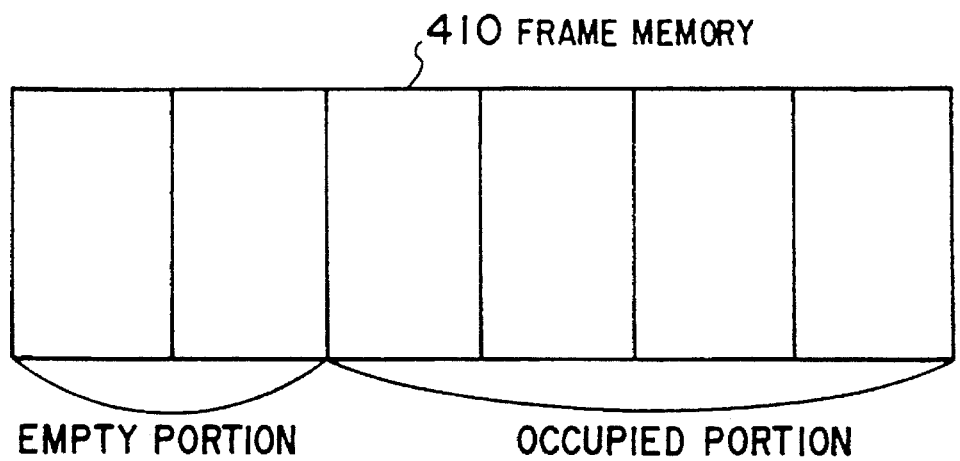
FIGS. 25A and 25B are diagrams for explaining how information is stored by a compression type storing system.
Figure 25B:
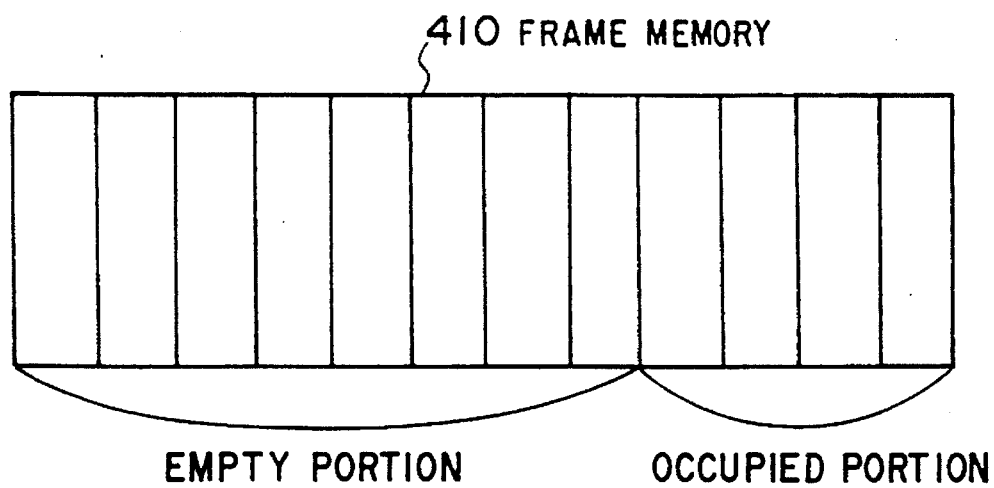

A twelfth embodiment of the present invention concerns with compression of information to be stored in the buffer unit according to the tenth embodiment. The twelfth embodiment is shown in FIG. 23. Within the buffer unit are provided the compressor 409 and the expander 411 as shown in FIG. 5. The buffer control unit 413 decodes the control signal sent from the controller 407 and controls the compressor and the expander based on the decoded control signal. FIGS. 25A and 25B show the information stored in the buffer unit and the compressed information stored therein. As shown in the Figures, it is appreciated that the compressed information makes it possible for the buffer unit to store more information than the uncompressed information. Hence, the compressed information can compensate for a longer lag of arrival time between the pieces of information.

Figure 26A:
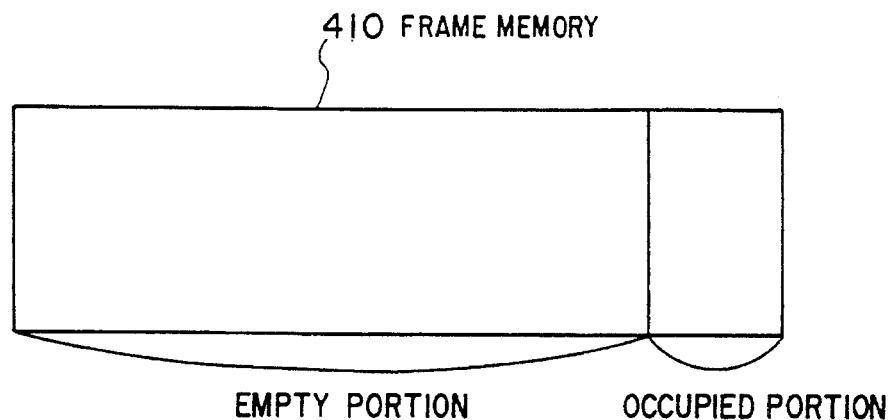
FIGS. 26A, 26B, 26C are diagrams for explaining how information is stored by a storing system with a variable compressing rate.
Figure 26B:
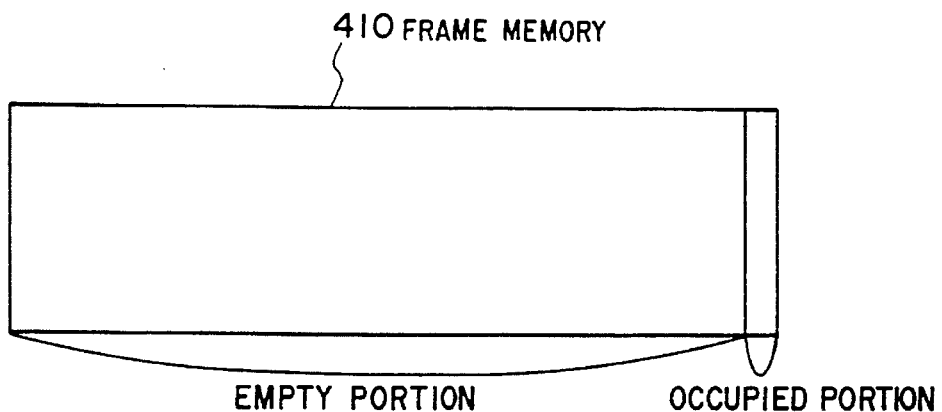
Figure 26C:
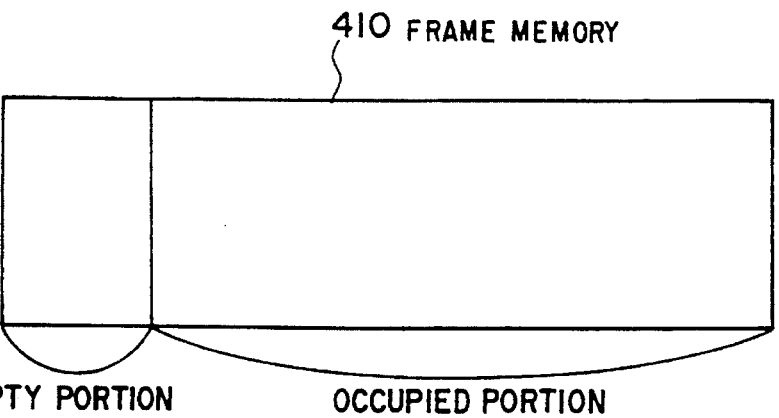

A thirteenth embodiment of the invention concerns with how to control a compression rate when the information is compressed and stored in the twelfth embodiment. In FIG. 23, the compressor 409 and the expander 411 (see FIG. 5) included in the buffer unit are designed to change a compression rate and an expansion rate. The compression rate and the expansion rate are controlled in the controller 407. FIG. 26 shows a status of the frame memory corresponding to each compression rate. It will be appreciated from FIG. 26 that the change of the compression rate makes it possible to change the amount of information to be stored. Further, unlike the fixed compression rate and expansion rate, the compression rate and the expansion rate are allowed to be changed depending on the amount of information to be sent from the output equipment.

Figure 27:
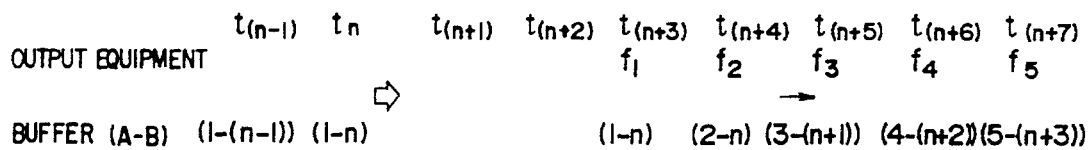
FIG. 27 is a time chart showing the system capable of handling more information than the volume of the buffer unit.

A fourteenth embodiment of the invention concerns with how to control the buffer unit if more information than the buffer volume is inputted. In FIG. 23, the controller 407 serves to detect that more information than the buffer volume is to be inputted to the buffer unit, based on the state of each buffer unit. Then, the controller 407 sends to the buffer unit a control signal so that the buffer unit can request the output equipment of the re-output. In response to the control signal, the buffer unit serves to interrupt storage of the information, send to the output equipment the control signal for requesting the output equipment of the re-output, and waits for the information sent from the output equipment. If the controller 407 sends the request for outputting the information to the buffer unit while the buffer unit is waiting for the information, the buffer unit serves to output the information stored therein. Then, FIG. 27 shows a time chart illustrating how the buffer unit handles more information than its volume based on the present embodiment. As shown in FIG. 27, the present embodiment makes it possible to synchronize the information if the time when the information to be stored in the buffer unit is being outputted is longer than the time when the request for re-output is issued to when the information comes to the buffer unit, independently of the allowable amount of information to be stored in the buffer unit and a time lag between each piece of information.

As described above, the multi-media server and the communication system employing the server according to the invention have the shared resources so that the multi-media server can process all the high-load processings like edition. Hence, each user terminal is merely required to execute the I/O processing, thereby making each user terminal less costly. Further, the coder and the coder for each media make it possible to solve the problems about increase of network traffic and storage volume. It results in allowing the number of user terminals to be registered in the network to be increased. Moreover, the multi-media server can provide a function of switching a coding or decoding characteristic depending on the attribute of each user terminal. This function makes it possible to transfer the data between the user terminals having respective attributes.

The synchronizing equipment according to the invention is designed to store the informations from two or more output equipments in the buffer unit, synchornize the informations, and output the synchronized information. The synchronizing equipment may, thus, use the existing output equipment. Further, it is possible to make use of the information existing in two or more output equipment if the prepared buffer units respectively correspond to the output equipments. The compression of the information in buffering and the request for re-output allows the synchronizing equipment to synchronize the informations even if the buffer unit has a smaller buffer volume independently of a long lag.

We claim:

1. In a communication system including a plurality of user communication terminals each having input/output (I/O) means for providing multi-media information containing video, voice and text information, and a multi-media server for storing or editing the multi-media information sent from each user communication terminal in response to information included in the multi-media information, said information being inputted by the user of said user communication terminal, and a communication network connecting said plurality of user communication terminals and said multi-media server for transmitting a transmission frame containing the multi-media information between said user communication terminals and said multi-media server, said multi-media server comprising:

an interface connected to said communication network for controlling a send/receive operation of a transmission frame including multi-media information;

information processing means for editing said multi-media information in accordance with the content of a header of said transmission frame;

memory means for recording said edited multi-media information;

a second memory means for recording attribute information of said each user communication terminal;

decoding means for decoding the multi-media information contained in the transmission frame received from said communication network through said interface and decoding said information in accordance with said attribute information;

coding means for coding processed multi-media information from said information processing means in accordance with the content of a header of said transmission frame; and control means for controlling said decoding means and coding means to edit each kind of said multi-media information in accordance with the content of the header of said transmission frame;

wherein said each user communication terminal includes:

an interface connected to said communication network and for controlling send/receive operation of the transmission frame transmitted from said multi-media server, decoding means for performing a plurality of decoding processings of the multi-media information contained in said transmission frame, coding means for performing a plurality of coding processings of the information, and processing means for performing the processing for each kind of said multi-media information in accordance with the content of the header of said transmission frame.

2. In a communication system including a plurality of user communication terminals each having input/output (I/O) means for providing multi-media information containing video, voice and text information, and a multi-media server for storing or editing the multi-media information sent from each user communication terminal in response to information included in the multi-media information, said information being inputted by the user of said user communication terminal, and a communication network connecting said plurality of user communication terminals and said multi-media server for transmitting a transmission frame containing the multi-media information between said user communication terminals and said multi-media server, said multi-media server comprising:

an interface connected to said communication network for controlling a send/receive operation of a transmission frame including multi-media information;

information processing means for editing said multi-media information in accordance with the content of a header of said transmission frame;

memory means for recording said edited multi-media information;

a second memory means for recording attribute information of said each user communication terminal;

decoding means for decoding the multi-media information contained in the transmission frame received from said communication network through said interface and decoding said information in accordance with said attribute information;

coding means for coding processed multi-media information from said information processing means in accordance with the content of a header of said transmission frame; and control means for controlling said decoding means and coding means to edit each kind of said multi-media information in accordance with the content of the header of said transmission frame;

wherein said user communication terminal includes:

means for adding at least an identifier indicating said multi-media server, an identifier indicating said communication terminal, an identifier indicating the kind of the multi-media information included in said transmission frame, and an identifier indicating the kind of the processing to be done for said multi-media information, and wherein said control means of said multi-media server registers the correspondence between the identifier of each communication terminal and the identifier indicating the kind of said multi-media information as said attribute information or updates said attribute information when said control portion receives said transmission frame from said communication terminal.

3. A multi-media server according to claim 2, wherein said control means of said multi-media server controls said decoding means and coding means in accordance with the identifier indicating the kind of the multi-media information registered in said first memory means in a manner to correspond to the identifier of said communication terminal and inputs the data processed in said decoding means and coding means to said second memory means.

4. A multi-media server according to claim 2, wherein said identifier indicating the kind of processings to be performed for said multi-media information actually indicates any one of write of data, read of data, read and write of data, and edition of data.

5. A multi-media server according to claim 4, wherein said edition of data includes to perform an edition for the decoded data stored in said second memory means.

6. A multi-media server according to claim 4, wherein said second memory means includes a plurality of concurrent I/O devices to be independently accessed, and the data sent from said plurality of I/O devices are cyclically processed and edited rapidly by allocating said plurality of I/O devices to each of serial video blocks.

7. A multi-media server according to claim 4, wherein said control means serves to read only a data area required for edition from a file at an "edition" mode, store the data area in a buffer area provided in the signal processing means, and editing the data area in the buffer area for concurrently performing the "write" or "read" processing for the file in response to the control of another terminal.

8. A multi-media server according to claim 7, wherein said second memory means includes a plurality of concurrent I/O devices to be independently accessed, and the data from said I/O devices is cyclically processed by allocating said I/O devices to each of serial video locks, and said control means serves to read only a data area required for edition from a file, store said data area in a buffer area provided in the signal processing means, and edit said data area in the buffer area for concurrently performing the "write" or read" processing of the data to the file in response to the control of another terminal.

9. In a communication system including a plurality of user communication terminals each having input/output (I/O) means for providing multi-media information containing video, voice and text information, and a multi-media server for storing or editing the multi-media information sent from each user communication terminal in response to information included in the multi-media information, said information being inputted by the user of said user communication terminal, and a communication network connecting said plurality of user communication terminals and said multi-media server for transmitting a transmission frame containing the multi-media information between said user communication terminals and said multi-media server, said multi-media server comprising:

an interface connected to said communication network for controlling a send/receive operation of a transmission frame including multi-media information;

information processing means for editing said multi-media information in accordance with the content of a header of said transmission frame;

memory means for recording said edited multi-media information;

a second memory means for recording attribute information of said each user communication terminal;

decoding means for decoding the multi-media information contained in the transmission frame received from said communication network through said interface and decoding said information in accordance with said attribute information;

coding means for coding processed multi-media information from said information processing means in accordance with the content of a header of said transmission frame; and control means for controlling said decoding means and coding means to edit each kind of said multi-media information in accordance with the content of the header of said transmission frame;

wherein said interface includes:

a protocol processing means connected to said communication network and for performing error control of the transmission frame transmitted from said communication terminal, and a switch circuit for selectively transmitting the information read from said protocol processing section or said second memory means to said decoding means or protocol processing means, wherein said control means serves to switch said switch circuit in accordance with the content of the header of said transmission frame.

10. In a communication system including a plurality of user communication terminals each having input/output (I/O) means for providing multi-media information containing video, voice and text information, and a multi-media server for storing or editing the multi-media information sent from each user communication terminal in response to information included in the multi-media information, said information being inputted by the user of said user communication terminal, and a communication network connecting said plurality of user communication terminals and said multi-media server for transmitting a transmission frame containing the multi-media information between said user communication terminals and said multi-media server, said multi-media server comprising:

an interface connected to said communication network for controlling a send/receive operation of a transmission frame including multi-media information;

information processing means for editing said multi-media information in accordance with the content of a header of said transmission frame;

memory means for recording said edited multi-media information;

a second memory means for recording attribute information of said each user communication terminal;

decoding means for decoding the multi-media information contained in the transmission frame received from said communication network through said interface and decoding said information in accordance with said attribute information;

coding means for coding processed multi-media information from said information processing means in accordance with the content of a header of said transmission frame; and control means for controlling said decoding means and coding means to edit each kind of said multi-media information in accordance with the content of the header of said transmission frame;

wherein said information processing means includes a function of processing said multi-media information at a processing speed corresponding to the content of the header of said transmission frame.

11. In a communication system including a plurality of user communication terminals each having input/output (I/O) means for providing multi-media information containing video, voice and text information, and a multi-media server for storing or editing the multi-media information sent from each user communication terminal in response to information included in the multi-media information, said information being inputted by the user of said user communication terminal, and a communication network connecting said plurality of user communication terminals and said multi-media server for transmitting a transmission frame containing the multi-media information between said user communication terminals and said multi-media server, said multi-media server comprising:

an interface connected to said communication network for controlling a send/receive operation of a transmission frame including multi-media information;

information processing means for editing said multi-media information in accordance with the content of a header of said transmission frame; and memory means for recording said edited multi-media information;

wherein said memory means includes:

recording media, and at least first and second I/O means for reading data from said recording media or writing data to said recording media, wherein said first I/O means serves to position said second I/O means on said recording media while said first I/O means is reading data from said recording media or writing data to said recording media and said second I/O means serves to position said first I/O means on said recording media while said second I/O means is reading data from said recording media or writing data to said recording media.

12. In a communication system including a plurality of user communication terminals each having input/output (I/O) means for providing multi-media information containing video, voice and text information, and a multi-media server for storing or editing the multi-media information sent from each user communication terminal in response to information included in the multi-media information, said information being inputted by the user of said user communication terminal, and a communication network connecting said plurality of user communication terminals and said multi-media server for transmitting a transmission frame containing the multi-media information between said user communication terminals and said multi-media server, said multi-media server comprising:

an interface connected to said communication network for controlling a send/receive operation of a transmission frame including multi-media information;

information processing means for editing said multi-media information in accordance with the content of a header of said transmission frame;

memory means for recording said edited multi-media information;

a second memory means for recording attribute information of said each user communication terminal;

decoding means for decoding the multi-media information contained in the transmission frame received from said communication network through said interface and decoding said information in accordance with said attribute information;

coding means for coding processed multi-media information from said information processing means in accordance with the content of a header of said transmission frame; and control means for controlling said decoding means and coding means to edit each kind of said multi-media information in accordance with the content of the header of said transmission frame;

wherein said user terminal includes a terminal memory for recording a directory of said multi-media information transmitted to said multi-media server and serves to specify the processing of said multi-media information by referring to said directory.

13. In a communication system including a plurality of user communication terminals each having input/output (I/O) means for providing multi-media information containing video, voice and text information, and a multi-media server for storing or editing the multi-media information sent from each user communication terminal in response to information included in the multi-media information, said information being inputted by the user of said user communication terminal, and a communication network connecting said plurality of user communication terminals and said multi-media server for transmitting a transmission frame containing the multi-media information between said user communication terminals and said multi-media server, said multi-media server comprising:

an interface connected to said communication network for controlling a send/receive operation of a transmission frame including multi-media information;

information processing means for editing said multi-media information in accordance with the content of a header of said transmission frame;

memory means for recording said edited multi-media information;

a second memory means for recording attribute information of said each user communication terminal;

decoding means for decoding the multi-media information contained in the transmission frame received from said communication network through said interface and decoding said information in accordance with said attribute information;

coding meads for coding processed multi-media information from said information processing means in accordance with the content of a header of said transmission frame; and control means for controlling said decoding means and coding means to edit each kind of said multi-media information in accordance with the content of the header of said transmission frame;

wherein said user terminal provides a receive buffer having a predetermined volume and stores the multi-media information received from said multi-media server in said receive buffer and sequentially decodes the multi-media information.

14. A communication system comprising:

a plurality of user communication terminals each having input/output (I/O) means for providing multi-media information containing video, voice and text information;

a multi-media server for storing or editing the multi-media information sent from each user communication terminal in response to information included in the multi-media information, said information being inputted by the user of said user communication terminal; and a communication network connecting said plurality of user communication terminals and said multi-media server for transmitting a transmission frame containing the multi-media information between said user communication terminals and said multi-media server, said multi-media server includes:

an interface connected to said communication network for controlling a send/receive operation of a transmission frame including multi-media information, information processing means for editing said multi-media information in accordance with the content of a header of said transmission frame, memory means for recording said edited multi-media information, a second memory means for recording attribute information of said each user communication terminal, decoding means for decoding the multi-media information contained in the transmission frame received from said communication network through said interface and decoding said information in accordance with said attribute information, coding means for coding processed multi-media information from said information processing means in accordance with the content of a header of said transmission frame, and control means for controlling said decoding means and coding means to edit each kind of said multi-media information in accordance with the content of the header of said transmission frame.

15. A communication system comprising:

a plurality of user communication terminals each having input/output (I/O) means for providing multi-media information containing video, voice and text information;

a multi-media server for storing or editing the multi-media information sent from each user communication terminal in response to information included in the multi-media information, said information being inputted by the user of said user communication terminal; and a communication network connecting said plurality of user communication terminals and said multi-media server for transmitting a transmission frame containing the multi-media information between said user communication terminals and said multi-media server, said multi-media server includes:

an interface connected to said communication network for controlling a send/receive operation of a transmission frame including multi-media information, information processing means for editing said multi-media information in accordance with the content of a header of said transmission frame, memory means for recording said edited multi-media information, a second memory means for recording attribute information of said each user communication terminal, decoding means for decoding the multi-media information contained in the transmission frame received from said communication network through said interface and decoding said information in accordance with said attribute information, coding means for coding processed multi-media information from said information processing means in accordance with the content of a header of said transmission frame, and control means for controlling said decoding means and coding means to edit each kind of said multi-media information in accordance with the content of the header of said transmission frame, wherein each user terminal includes a synchronizing unit for integrating time-series data outputted from a plurality of output equipments and outputting said integrated data, said synchronizing unit including a plurality of buffer units for controlling output of the information in said output equipment and compressing, retaining, or expanding the information sent from said output equipments and a controller for controlling said output equipments through said buffer units and controlling said buffer units for synchronizing the information sent from said output equipments.

16. A communication system according to claim 15, wherein said controller of said synchronizing unit serves to control said buffer units for synchronizing the earlier information with the later information received by said buffer units.

17. A communication system according to claim 16, wherein said synchronizing unit provides means for synchronizing the information by requesting re-output of said information to said output equipment when said buffer unit stores said information.

18. A communication system according to claim 15, wherein said synchronizing unit controls said buffer units so that said information arrived earlier to said buffer unit may be synchronized with said information arrived later.

19. A communication system according to claim 15, wherein said synchronizing unit serves to read said information to be outputted from said controller in said buffer units in advance.

20. A communication system according to claim 15, wherein said synchronizing unit includes means for compressing input information when said buffer unit stores said information.

21. A communication system according to claim 20, wherein said synchronizing unit provides variable compression rates when said buffer unit compresses said information.

* * * * *